US008280608B2

(12) United States Patent
Senda et al.

(10) Patent No.: US 8,280,608 B2
(45) Date of Patent: Oct. 2, 2012

(54) SYSTEM FOR RESTARTING INTERNAL COMBUSTION ENGINE WHEN ENGINE RESTART CONDITION IS MET

(75) Inventors: Takashi Senda, Niwa-gun (JP); Kenji Kawahara, Kariya (JP); Akira Kato, Anjo (JP); Masayuki Tomura, Oobu (JP); Masanori Yamamura, Nagoya (JP)

(73) Assignee: Denso Corporation, Kariya (JP)

( * ) Notice: Subject to any disclaimer, the term of this patent is extended or adjusted under 35 U.S.C. 154(b) by 108 days.

(21) Appl. No.: 12/714,991

(22) Filed: Mar. 1, 2010

(65) Prior Publication Data
US 2010/0222973 A1 Sep. 2, 2010

(30) Foreign Application Priority Data

Feb. 27, 2009 (JP) ................................ 2009-045314
May 29, 2009 (JP) ................................ 2009-131146
Jan. 6, 2010 (JP) ................................ 2010-000946

(51) Int. Cl.
*G06F 19/00* (2006.01)
*G06G 7/70* (2006.01)

(52) U.S. Cl. ..................................... 701/101

(58) Field of Classification Search .................... 701/84, 701/86, 101, 102, 112; 123/179.14, 319, 123/332; 477/99, 166, 167, 180, 181
See application file for complete search history.

(56) References Cited

U.S. PATENT DOCUMENTS

| 4,510,396 A * | 4/1985 | Uchida et al. ............... 290/30 R |
| 6,352,489 B1 * | 3/2002 | Kuroda et al. .................... 477/5 |
| 7,797,099 B2 * | 9/2010 | Terada .......................... 701/112 |
| 2009/0206786 A1 | 8/2009 | Lecole et al. |

FOREIGN PATENT DOCUMENTS

| DE | 102 51 765 A1 | 5/2004 |
| EP | 1 657 436 A2 | 5/2006 |
| FR | 2 875 556 A1 | 3/2006 |
| GB | 2 427 438 A | 12/2006 |
| JP | A-11-257118 | 9/1999 |
| JP | A-2000-18060 | 1/2000 |

(Continued)

OTHER PUBLICATIONS

Japanese Office Action issued in Japanese Application No. 2009-131146 dated Sep. 13, 2011 (with translation).

(Continued)

*Primary Examiner* — Mary Cheung
*Assistant Examiner* — Kyle K Tsui
(74) *Attorney, Agent, or Firm* — Oliff & Berridge, PLC

(57) ABSTRACT

A system is installed in a vehicle having an internal combustion engine, a transmission, and a clutch. The system restarts, according to at least one engine restart condition is met, the internal combustion engine that has been automatically controlled for stop thereof. The system includes a restart-condition determiner configured to determine that, as the at least one engine restart condition, an operation of the clutch is started by a driver of the vehicle for shifting the second state to the first state. The system includes a state detector configured to detect an operated state of the clutch during the clutch is shifted from a disengagement state to an engagement state. The system includes a restart controller configured to determine whether to enable or disable the restart of the internal combustion engine according to the operated state of the clutch detected by the state detector.

30 Claims, 16 Drawing Sheets

FOREIGN PATENT DOCUMENTS

| | | |
|---|---|---|
| JP | A-2003-035174 | 2/2003 |
| JP | A-2004-092453 | 3/2004 |
| JP | A-2006-138221 | 6/2006 |
| JP | A-2010-223007 | 10/2010 |
| JP | A-2010-223008 | 10/2010 |
| WO | WO 2009/063152 A1 | 5/2009 |

OTHER PUBLICATIONS

Office Action dated Mar. 27, 2012 issued in Japanese Patent Application No. 2010-000946 (with translation).

Jul. 25, 2012 Search Report issued in European Patent Application No. 10002018.9.

* cited by examiner

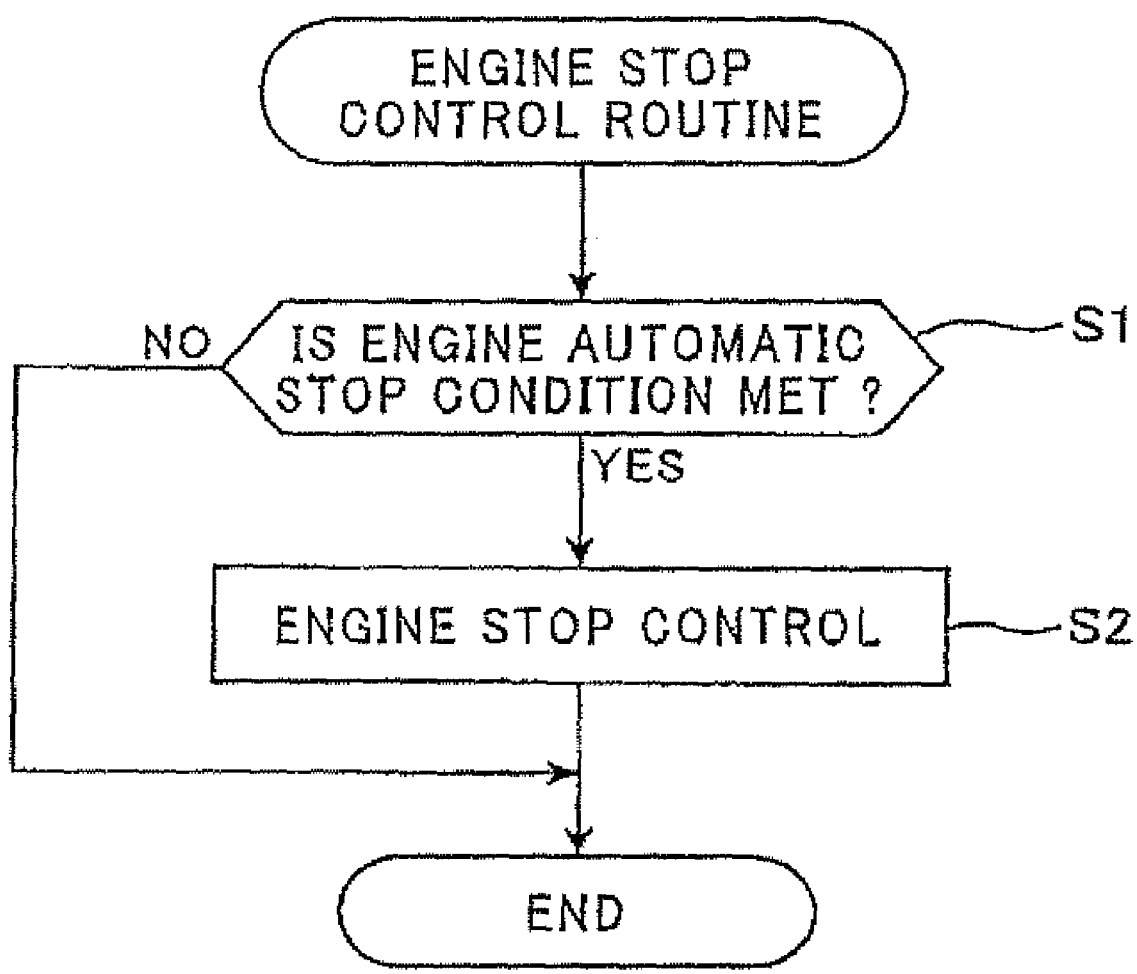

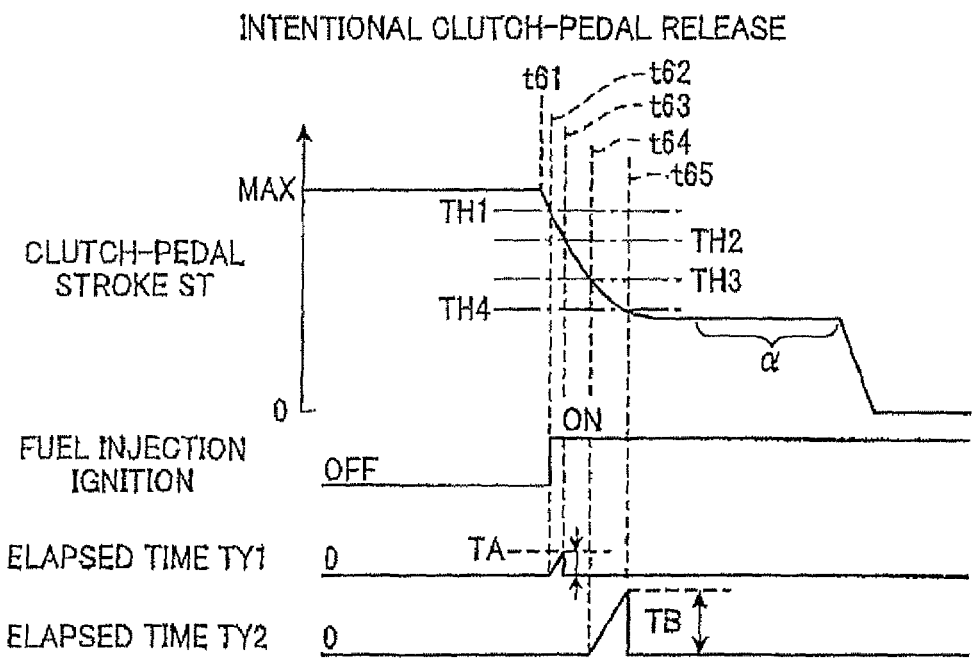
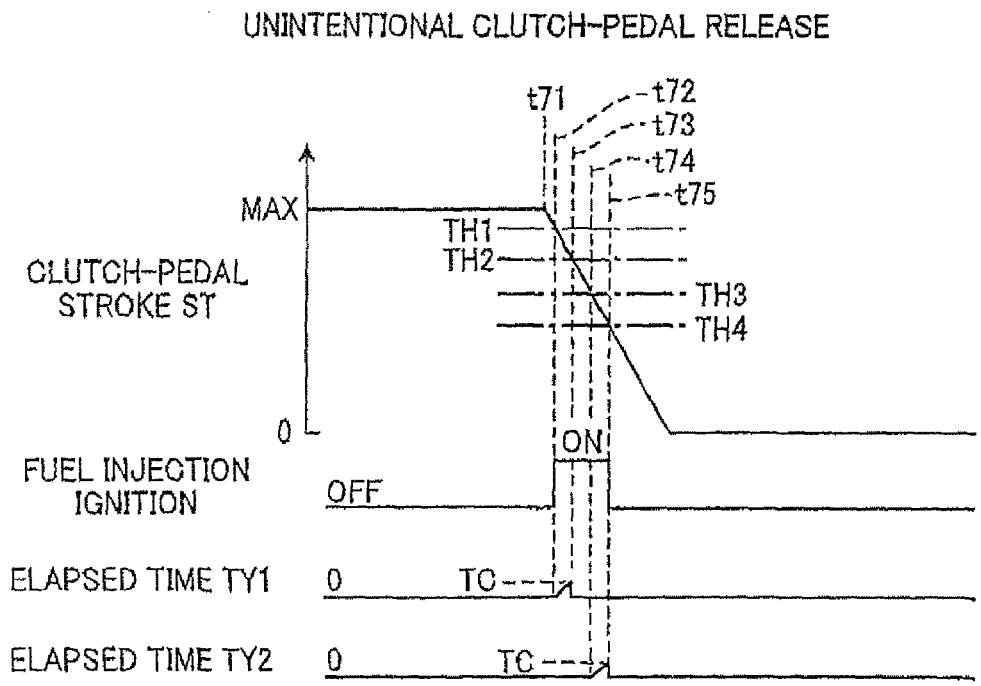

SYSTEM FOR RESTARTING INTERNAL COMBUSTION ENGINE WHEN ENGINE RESTART CONDITION IS MET

CROSS REFERENCE TO RELATED APPLICATIONS

This application is based on Japanese Patent Applications 2009-045314, 2009-131146, and 2010-000946 filed on Feb. 27, 2009, May 29, 2009, and Jan. 6, 2010, respectively. This application claims the benefit of priority from the Japanese Patent Applications, so that the descriptions of which are all incorporated herein by reference.

FIELD OF THE INVENTION

The present invention relates to systems for restarting internal combustion engines when at least one of predetermined engine restart conditions is met.

BACKGROUND OF THE INVENTION

Some types of vehicles installed with an engine stop-and-start system, such as an idle reduction control system, have been recently developed for reduction in fuel cost, in exhaust emission, and the like. Such engine stop-and-start systems are designed to, in response to a driver's engine stop operation, shut off fuel supplied to an internal combustion engine of a vehicle so as to automatically stop it. After the stop of the internal combustion engine, these engine stop-and-start systems are designed to cause, in response to a driver's operation to restart the vehicle, a starter to crank the internal combustion engine, thus restarting the internal combustion engine.

In an example of idle-reduction control for manual transmission vehicles, European Patent Application Publication NO. EP 1657436A2 corresponding to Japanese Patent Application Publication NO. 2006-138221 discloses a first technique to detect the driver's depression of the clutch pedal of a target vehicle for disconnecting the internal combustion engine from the transmission during the internal combustion engine being subjected to engine-stop control. Then, the first technique determines that one of engine restart conditions is met, thus restarting the internal combustion engine in response to the determination. This first technique grasps the driver's depression of the clutch pedal as the driver's engine-restart request. This properly adjusts restart timing of the internal combustion engine, thus improving fuel efficiency.

The European Patent Application Publication, in order to fulfill more fuel-efficiency improvement requirements, discloses a second technique to detect the driver's depression of the clutch pedal so as to determine that one of engine stop conditions is met, thus automatically carrying out engine-stop control of the internal combustion engine.

Under the engine-stop control of the internal combustion engine, the second technique is designed to determine whether the depressed clutch pedal is released by the driver, and, when it is determined that the depressed clutch pedal is released by the driver so as to connect the internal combustion engine to the transmission, to recognize that one of engine-restart conditions is met, thus restarting the internal combustion engine.

SUMMARY OF THE INVENTION

The inventors have discovered that there are some problems in the first and second techniques disclosed in the European Patent Publication.

The driver's depression of the clutch pedal does not always represent the driver's intention to restart the internal combustion engine. However, because the first technique is designed to determine that the driver's depression of the clutch pedal always represents that one of the engine restart conditions is met, the engine restart may be carried out independently of the driver's intention.

The driver's release of the depressed clutch pedal does not always represent the driver's intention to restart the internal combustion engine. However, because the second technique is designed to determine that the driver's release of the depressed clutch pedal always represents that one of the engine restart conditions is met, the engine restart may be carried out independently of the driver's intention.

For example, during the clutch pedal being depressed by the driver, when the driver at least slightly releases the depressed clutch pedal to carry out alternative operations, the engine restart may be carried out independently of the driver's intention; these alternative operations include an operation of taking out baggage from the rear seat or the loading space, and an operation of stopping the target vehicle at the neutral position of the manual transmission. This driver's unintentionally engine restart may cause unexpected engine stalling, and cause the occupants to be shocked or to feel uncomfortable.

In view of the circumstances set force above, the present invention seeks to provide systems for restarting an internal combustion engine; these systems are designed to solve at least one of the problems set forth above.

Specifically, the present invention aims at providing systems for restarting an internal combustion engine; these systems are designed to implement engine restarts according to the driver's intention to thereby optimize the engine restarts.

According to one aspect of the present invention, there is provided a system installed in a vehicle having an internal combustion engine, a transmission, and a clutch. The clutch is engaged in a first state to allow a transfer of power from the internal combustion engine to the transmission and disengaged in a second state to shut off the transfer of the power. The system is configured to restart, according to at least one engine restart condition is met, the internal combustion engine that has been automatically controlled for stop thereof. The system includes a restart-condition determiner configured to determine that, as the at least one engine restart condition, an operation of the clutch is started by a driver of the vehicle for shifting the second state to the first state. The system includes a state detector configured to detect an operated state of the clutch during the clutch is shifted from the second state to the first state. The system includes a restart controller configured to determine whether to enable or disable the restart of the internal combustion engine according to the operated state of the clutch detected by the state detector.

According to another aspect of the present invention, there is provide a system installed in a vehicle having an internal combustion engine, a transmission, and a clutch with a driver-operable clutch member. According to a driver's operation of the driver-operable clutch member, the clutch is engaged in a first state to allow a transfer of power from the internal combustion engine to the transmission and disengaged in a second state to shut off the transfer of the power. The transmission has one gear position selected from a plurality of gear positions for converting, according to the selected one of the plurality of gear positions, the power to be outputted from the transmission. The plurality of gear positions includes a neutral position. The system is configured to restart, according to at least one engine restart condition is met, the internal combustion engine that has been automatically controlled for stop thereof. The system includes a restart-condition determiner configured to determine whether the one gear position of the transmission is any gear position in the plurality of gear positions other than the neutral position and an operated variable of the driver's clutch operable member is increased from a first threshold value and thereafter to become lower than the first threshold value and lower than a second threshold value. The second threshold value is higher than a preset value corresponding to a clutch-meet point. The clutch-meet point represents a start of the transfer of the power from the internal combustion engine to the transmitter. The system includes a restart controller configured to determine that the at least one engine restart condition is met to thereby carry out the restart of the internal combustion engine when it is determined that the one gear position of the transmission is any gear position in the plurality of gear positions other than the neutral position and the operated variable of the driver's clutch operable member is increased from the first threshold value and thereafter to become lower than the first threshold value and lower than the second threshold value.

BRIEF DESCRIPTION OF THE DRAWINGS

Other objects and aspects of the invention will become apparent from the following description of embodiments with reference to the accompanying drawings in which:

FIG. 2A is a flowchart schematically illustrating an engine stop control routine to be executed by an ECU illustrated in FIG. 1 according to the first embodiment;

FIG. 8A is a timing chart illustrating the transition of the clutch-pedal stroke and that of each of the elapsed times when the engine restart task is carried out in response to the driver's intentional release of the depressed clutch pedal according to the fourth embodiment of the present invention;

FIG. 8B is a timing chart illustrating the transition of the clutch-pedal stroke and that of each of the elapsed times when the engine restart is carried out according to the driver's unintentional release of the depressed clutch pedal according to the fourth embodiment;

DETAILED DESCRIPTION OF EMBODIMENTS OF THE INVENTION

Figure 1:
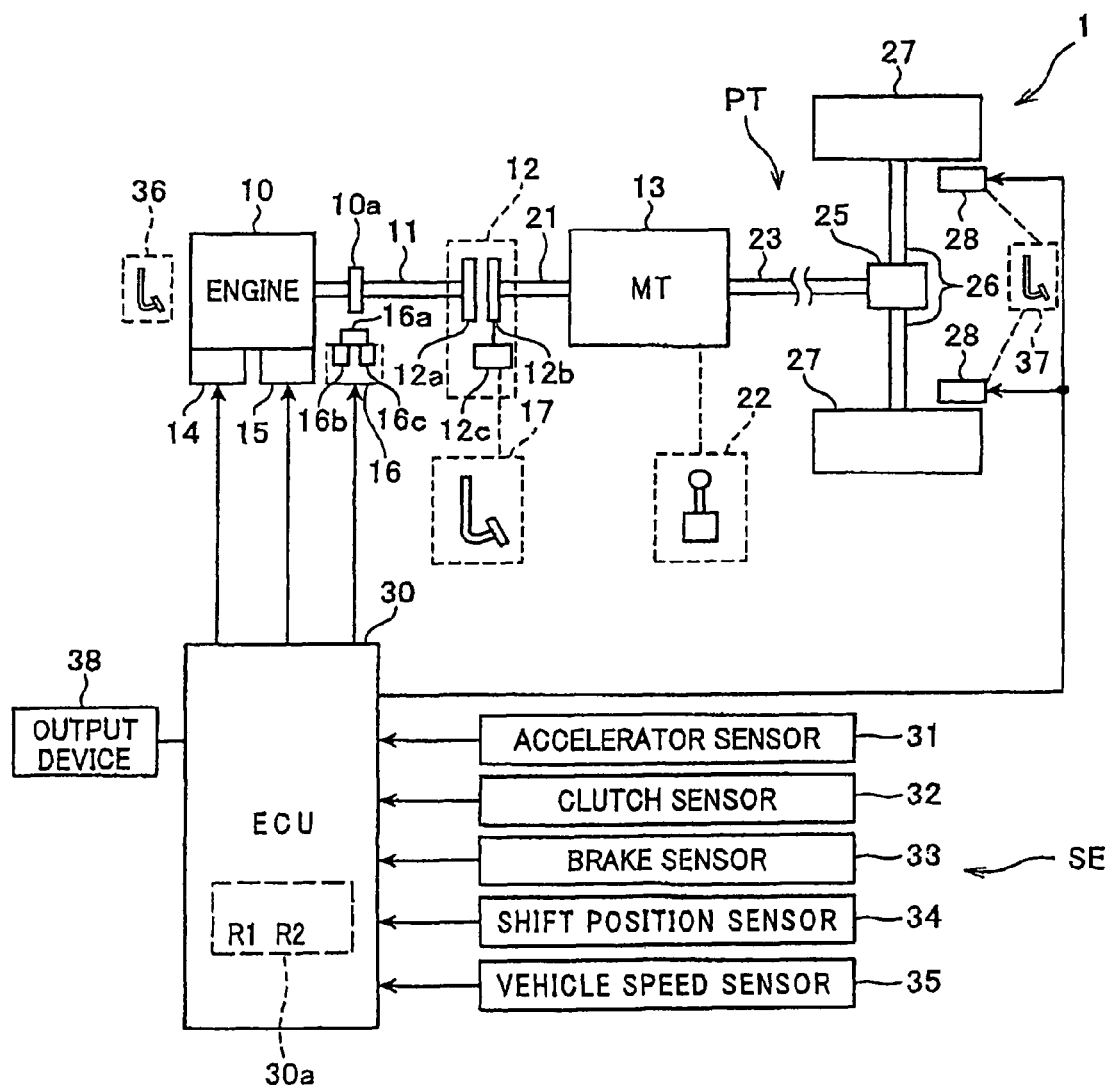
FIG. 1 is a schematic system configuration diagram of a vehicle control system according to the first embodiment of the present invention.

Embodiments of the present invention will be described hereinafter with reference to the accompanying drawings. In the drawings, identical reference characters are utilized to identify identical corresponding components.

First Embodiment

A vehicle control system 1 installed in a vehicle equipped with, an internal combustion engine 10 and a manual transmission 13 according to the first embodiment of the present invention will be described hereinafter with reference to FIGS. 1 to 4. The vehicle control system 1 is designed as an example of systems for restarting an internal combustion engine according to the first embodiment.

The vehicle control system 1 includes an ECU (Electronic Control Unit) 30 for controlling, for example, overall operations of the vehicle.

The engine 10 is designed as, for example, a multiple cylinder engine. The engine 10 has an output shaft, such as a crankshaft 11, on which a ring gear 10a is mounted. An end of the output shaft 11 is coupled via a clutch 12 to a transmission input shaft 21 coupled to the manual transmission 13.

The engine 10 works to compress air-fuel mixture or air by a moving piston within each cylinder, and burn the compressed air-fuel mixture or the mixture of the compressed air and fuel within each cylinder to change the fuel energy to mechanical energy (power), thus rotating the output shaft 11. The rotation of the output shaft 11 is transferred to driving wheels 27 through a powertrain PT including the manual transmission 13 to thereby drive the vehicle.

In the vehicle, for controlling the engine 10, an injector 14 as a fuel injection means is installed for each cylinder of the engine 10, and an igniter 15 as an ignition means is installed for each cylinder of the engine 10.

The injector 14 is controlled to spray fuel either directly into each cylinder of the engine 10 or into an intake manifold (or intake port) just ahead of each cylinder thereof to thereby burn the air-fuel mixture in each cylinder of the engine 10.

The igniter 15 is controlled to provide an electric current or spark to ignite an air-fuel mixture in each cylinder of the engine 10, thus burning the air-fuel mixture. When the internal combustion engine is designed as a diesel engine, the igniter 15 can be eliminated.

In addition, in the vehicle, for cranking the engine 10, a starter 16 is installed.

The starter 16 is, for example, made up of a pinion gear 16a, a pinion actuator 16b, and a motor 16c. The pinion-gear actuator 16b is designed to shift the pinion 16a toward the ring gear 10a to be engaged therewith under control of the ECU 30. The motor 16c is designed to rotate the pinion 16a being engaged with the ring gear 10a under control of the ECU 30 to thereby turn the output shaft 11 of the engine 10, in other words, crank the engine 10. The pinion-gear actuator 16b can be designed to shift the rotating pinion 16a by the motor 16c toward the ring gear 10a to be engaged therewith under control of the ECU 30 to thereby crank the engine 10.

The clutch 12 is for example made up of a circular plate, such as a flywheel (clutch plate), 12a coupled to the one end of the output shaft 11, and a circular plate, such as a clutch disk, 12b coupled to the transmission input shaft 21 of the manual transmission 13, and a clutch actuator 12c linked to a clutch pedal 17 described later.

The flywheel 12a and the clutch disk 12b are located to be opposite to each other.

The clutch 12 is operative to couple the flywheel 12a and the clutch disk 12b to each other or uncouple them from each other according to the driver's depression of a clutch pedal 17 of the vehicle or the driver's release of the depressed clutch pedal 17. In other words, the clutch 12 is selectively engaged or disengaged according to the driver's operation of the clutch pedal 17.

Specifically, when the clutch pedal 17 is depressed by the driver, the clutch actuator 12c actuates a piston to move it by foot pressure (clutch-pedal pressure) of the clutch pedal 17 to thereby produce hydraulic pressure.

The clutch actuator 12c separates the flywheel 12a and the clutch disk 12b from each other based on the produced hydraulic pressure to thereby disconnect the engine 10 from the manual transmission 13. This disconnection shuts off the transfer of power (torque and the number of revolutions) based on the rotation of the crankshaft 11 to the manual transmission 13; this state allows the vehicle to change a gear ratio of the manual transmission 13.

In contrast, when the depressed clutch pedal 17 is released by the driver, the clutch actuator 12c actuates the piston by foot pressure (clutch-pedal pressure) of the clutch pedal 17 to thereby produce hydraulic pressure. The clutch actuator 12c squeezes one of the flywheel 12a and the clutch disk 12b against the other thereof based on the produced hydraulic pressure to closely join them. This joining connects the engine 10 to the manual transmission 13 to thereby allow the transfer of the power based on the rotation of the crankshaft 11 to the manual transmission 13. Note that the clutch 12 and the clutch pedal 17 provide a clutch means for switching the transfer of the power from the engine 10 to the manual transmission 13 and the shut-off of the transfer of the power.

The manual transmission 13 consists of a train of gearsets containing, for example, a plurality of forward gearsets and one reverse gearset; these plurality of forward gearsets are a first gearset, a second gearset, a third gearset, and a fourth gearset. The manual transmission 13 is coupled to one end of a transmission output shaft 23, and also to a hand-operable shift lever 22.

The manual transmission 13 is Operative to select any one of a plurality of gear positions according to a corresponding one of shift positions selectable by a hand-operable shift lever 22; any one of the plurality of gear positions defines a transmission gear ratio between the input shaft 21 and the output shaft 23.

For example, the plurality of gear positions include forward gear positions (a first gear position, a second gear position, a third gear position, and a fourth gear position), a reverse position, and a neutral position. The forward gear positions correspond to the forward gearsets, respectively, and the reverse position corresponds to the reverse gearset.

The higher the order of the gear position (gear ratio) to be selected by the manual transmission 13 is, the higher the number of revolutions of the output shaft 23 is. The reverse position converts the number of revolutions of the input shaft 21 in a preset direction to the number of revolutions of the output shaft 23 in the reverse direction. The neutral position prevents power based on the rotation of the output shaft 11 from being delivered to the output shaft 23.

Specifically, when any one of the shift positions is selected by the shift lever 22 operated by the driver, the manual transmission 13 selects any one of a plurality of gear positions according to the selected shift position, and converts, in accordance with the selected gear position (shift position), power based on the rotation of the transmission input shaft 21 to power of the transmission output shaft 23.

The other end of the transmission output shaft 23 is coupled via a differential gear system 25 to driving axels 26. The driving wheels 27 are so mounted on both ends of the axels 26 as to be rotatable together with the driving axels 26.

The differential gear system 25 is operative to transfer the power from the transmission output shaft 23 to the driving wheels 27 via the driving axels 26 to thereby turn the driving wheels 27.

In addition, in the vehicle, for slowing down or stopping the vehicle, a brake actuator 28 is installed for each of wheels including the driving wheels 27.

Under control of the ECU 30 in response to the driver's depression of a brake pedal 37, the brake actuator 28 is designed to hydraulically apply a braking force to a corresponding wheel to thereby slow down or stop the rotation of a corresponding wheel.

In addition, in the vehicle, for measuring the operating conditions of the engine 10 and the driving conditions of the vehicle, sensors SE are installed in the vehicle.

Each of the sensors SE is operative to continuously or periodically measure an instant value of a corresponding one parameter associated with the operating conditions of the engine 10 and/or the vehicle and to continuously or periodically output, to the ECU 30, data indicative of the measured value of a corresponding one parameter.

Specifically, the sensors SE include, for example, an accelerator sensor 31, a clutch sensor 32, a brake sensor 33, a shift position sensor 34, a vehicle speed sensor 35, a rotational speed sensor, and load sensors (airflow meter and intake-pressure sensor); these sensors SE are electrically connected to the ECU 30.

The accelerator sensor 31 is operative to measure the stroke of a driver-operable accelerator pedal 36 of the vehicle depressed by the driver; this accelerator pedal 36 is linked to a throttle valve for controlling the amount of air entering the intake manifold. The accelerator sensor 31 is operative to output, as data representing a driver's starting request, acceleration request, or deceleration request for the engine 10, the measured stroke of the accelerator pedal 36.

The clutch sensor 32 is operative to measure the stroke of the clutch pedal 17 of the vehicle depressed by the driver, and output, as data, the measured stroke of the clutch pedal 17.

The brake sensor 33 is operative to measure the stroke of the brake pedal 37 of the vehicle depressed by the driver, and output, as data representing a driver's deceleration request, the measured stroke of the brake pedal 37.

In the first embodiment, the stroke of a pedal represents an amount of movement (swing) of the pedal from its original (non-depressed) position to its presently located (depressed) position. For example, when the clutch pedal 17 is fully depressed, the stroke of the clutch pedal 17 is determined as a maximum value corresponding to 100%.

The shift position sensor 34 is operative to detect one of the shift positions selected by the driver's operation of the shift lever 22, and output, as data, the detected shift position.

The vehicle speed sensor 35 is operative to measure the vehicle speed and output, as data, the measured vehicle speed.

The rotational speed sensor is operative to measure the rotational speed of the output shaft 11 of the engine 10, and output, as data, the measured rotational speed of the engine 10.

The airflow meter is operative to measure the flow of air through the intake manifold, and output, as data, the measured flow of air through the intake manifold.

The intake-pressure sensor is operative to measure pressure changes in the intake manifold, and to output, as data, the measured pressure changes.

The ECU 30 is designed as, for example, a normal microcomputer circuit consisting of, for example, a CPU, a storage medium 30a including a ROM (Read Only Memory), such as a rewritable ROM, a RAM (Random Access Memory), and the like, an 10 (Input and output) interface, and so on.

The storage medium 30a stores therein beforehand various engine control programs.

The ECU 30 is operative to:
receive pieces of data measured by the sensors SE and outputted therefrom; and
control, based on the operating conditions of the engine 10 determined by at least some of the received pieces of data measured by the sensors SE, various actuators including the injectors 14, the igniters 15, the brake actuators 28, and so on to thereby adjust various controlled variables of the engine 10.

For example, the ECU 30 is programmed to:
compute a proper injection quantity for the fuel injector 14 for each cylinder and a proper ignition timing for the igniter 15;
instruct the fuel injector 14 for each cylinder to spray, at a corresponding computed proper injection timing, a corresponding computed proper quantity of fuel into each cylinder; and instruct the igniter 15 for each cylinder to ignite an air-fuel mixture in each cylinder at a corresponding computed proper ignition timing.

In addition, the engine control programs stored in the storage medium 30a include an engine stop control routine (program) R1. The ECU 30 repeatedly runs the engine stop control routine R1 in a given cycle during its being energized.

Specifically, in accordance with the engine stop control routine R1, the ECU 30 determines whether at least one of predetermined engine automatic stop conditions is met based on the data measured by the sensors SE in step S1 of FIG. 2A.

Upon determining that no predetermined engine automatic stop conditions are met based on the data measured by the sensors SE (NO in step S1), the ECU 30 exits the engine stop control routine R1.

In contrast, when the driver fully releases the accelerator pedal 36 (the stroke of the accelerator pedal 36 is zero) to fully close the throttle valve so that the engine 10 is in idle, or the driver depresses the brake pedal 37, or the vehicle speed is equal to or lower than a preset speed, the ECU 30 determines that an engine automatic stop request occurs, in other words, at least one of the engine automatic stop conditions is met (YES in step S1).

Then, the ECU 30 carries out automatic stop control of the engine 10 in step S2. Specifically, the ECU 30 controls the injector 14 and/or the igniter 15 for each cylinder to stop the burning of the air-fuel mixture in each cylinder. The stop of the burning of the air-fuel mixture in each cylinder of the engine 10 means the automatic stop of the engine 10.

After the automatic stop of the engine 10, the rotational speed of the engine 10 automatically drops, in other words, the output shaft 11 coasts. During the output shaft 11 coasting and after the complete stop of the rotation of the output shaft 11, the ECU 30 determines whether at least one of predetermined engine restart conditions is met, in other words, an engine restart request occurs based on the data measured by the sensors SE.

The predetermined engine restart conditions include, for example, the release of the brake pedal 37 (the amount of a manipulated variable of the brake pedal is zero), the depression of the accelerator pedal 36, and the like. The predetermined engine restart conditions include an occurrence of a restart instruction inputted from accessories, such as an air conditioner and the like, installed in the vehicle. The predetermined engine restart conditions include the reduction of the depression at the engine manifold applied to the brake actuator 28 for each of the wheels. This reduction of the depression at the engine manifold applied to the brake actuator 28 can be determined by the ECU 30 according to, for example, the data measured by the brake sensor 33.

Particularly, in the first embodiment, the predetermined engine restart conditions include the start of releasing the fully depressed clutch pedal 17.

Specifically, when determining that the driver starts to release the fully depressed clutch pedal 17 based on the data outputted from the clutch sensor 32, the ECU 30 determines that at least one of the predetermined engine restart conditions is met, in other words, that the clutch 12 is started to be shifted from the disengagement state (power shut-off state) to the engagement state (power transfer state) by the driver. That is, the release operation of the fully depressed clutch pedal 17 corresponds to the operation of the clutch 12 from the disengagement state (power shut-off state) to the engagement state (power transfer state) by the driver.

As described above, in the first embodiment, the vehicle control system 1 is configured to carry out the engine restart task in response to the start of releasing the fully depressed clutch pedal 17 by the driver.

The configuration however may cause the system 1 to carry out the engine restart task without the driver's intention of restarting the engine 10 (without the driver's intention of starting the vehicle).

For example, when the driver moves the foot fully depressing the clutch pedal 17 or changes the driver's position so as to unintentionally start to release the fully depressed clutch pedal 17, the restart of the engine 10 may be carried out independently of the driver's intention. This unintended restart of the engine 10 may cause unexpected engine stalling, cause the occupants to be shocked or to feel uncomfortable, and/or unintentionally start the vehicle.

In order to address the problems due to the unintentional engine restart set forth above, the ECU 30 is designed to determine the operated state of the clutch 12 from the disengagement state (power shut-off state) to the engagement state (power transfer state) in other words, how the clutch pedal 17 is operated (released) from the clutch disengagement state to the clutch engagement state. Based on a result of the determination, the ECU 30 is designed to enable or disable the engine restart.

Specifically, when the driver intends to carry out the engine restart task, because some time is required to engage the clutch 12, the depressed clutch pedal 17 is released slowly. In contrast, when the driver does not intend to carry out the engine restart task, the depressed clutch pedal 17 is released immediately.

The inventors focus on the difference between the driver's operation of the clutch pedal 17 to intentionally restart the engine 10 and the driver's operation of the clutch pedal 17 without intending to carry out the engine restart task. That is, a specific feature of the first embodiment determines the driver's operating (releasing) state of the depressed clutch pedal 17 according to a time taken to complete the engagement of the clutch 12. When disabling the engine restart, the specific feature forcibly terminates an engine-restart control task being carried out thereby.

An engine restart control routine (program) R2 included in the engine control programs stored in the storage medium 30a is configured to implement the specific feature set forth above. The ECU 30 repeatedly runs the engine restart control routine R2 in a given cycle during its being energized.

Specifically, in accordance with the engine restart control routine R2, the ECU 30 determines whether the engine 10 is automatically stopped (burning is stopped) and the clutch pedal 17 is fully depressed in step S11.

In step S12, the ECU 30 determines whether the actual selected gear position of the manual transmission 13 is a preset forward gear position, for example, the first gear position in step S12.

The operations in steps S11 and S12 represent an operation of whether a precondition required to carry out the engine restart task is met.

Specifically, upon determining that the engine 10 is automatically stopped and the clutch pedal 17 is fully depressed and that the actual selected gear position of the manual transmission 13 is the preset forward gear position (YES in each of steps S11 and S12), the ECU 30 proceeds to step S13.

Otherwise, upon determining that the engine 10 is not automatically stopped and/or the clutch pedal 17 is not fully depressed, or the actual selected gear position of the manual transmission 13 is not the preset forward gear position (NO in at least one of steps S11 and 312), the ECU 30 exits the engine restart control routine R2.

In addition, when the affirmative determinations are carried out in steps S11 and S12, the ECU 30 sets a flag to a preset bit, such as 1, indicative of the affirmative determinations in steps S11 and S12, and stores the flag in the storage medium 30a. The information of the flag is maintained until the restart of the engine 10 is completed or the engine restart is forcibly terminated. In other words, once the affirmative determinations in steps S11 and S12 are carried out in the current execution of the engine restart control routine R2, the determinations in step S11 and S12 in the next and subsequent executions of the routine R2 by the ECU 30 axel continuously affirmative based on the flag stored in the storage medium 30a.

In step S13, the ECU 30 determines whether a present value of the stroke ST of the depressed clutch pedal 17 measured by the clutch sensor 32 is equal to or lower than a threshold value TH1. The threshold value TH1 is set to be in proximity to the maximum value of the stroke ST of the depressed clutch pedal 17 corresponding to 100%. When the clutch-pedal stroke ST is at the maximum value, the clutch pedal 17 is fully depressed.

That is, when the driver lets up on the clutch pedal 17 from its fully depressed state so that the release of the depressed clutch pedal 17 is started, the present value of the stroke ST of the depressed clutch pedal 17 measured by the clutch sensor 32 is equal to or lower than the threshold value TH1 (YES in step S13). Then, the ECU 30 proceeds to step S14.

Otherwise, the present value of the stroke ST of the depressed clutch pedal 17 measured by the clutch sensor 32 is higher than the threshold value TH1 (NO in step S13), the ECU 30 terminates the engine restart control routine R2.

In step S14, the ECU 30 carries out an engine restart task. For example, the ECU 30 sends, to the pinion actuator 16b, drive instructions. The drive instructions drive the pinion actuator 16b to shift the pinion 16a to be engaged with the ring gear 10a while driving the motor 15c to rotate it. This drive rotates the output shaft 11, thus cranking the engine 10. As another example, during the output shaft 11 coasting, the ECU 30 instructs the pinion actuator 16a to shift the pinion 16a to be engaged with the ring gear 10a. Thereafter, the ECU 30 instructs the motor 16c to rotate with the pinion 13 being meshed with the ring gear 10a. This drive rotates the output shaft 11, thus cranking the engine 10.

In step S14, the ECU 30 computes a proper injection quantity for the fuel injector 14 for each cylinder and a proper ignition timing for the igniter 15. Then, the ECU 30 sends, to the fuel injector 14 for each cylinder, fuel-injection instructions that instruct the fuel injector 14 for each cylinder to spray, at a corresponding computed proper injection timing, a corresponding computed proper quantity of fuel into each cylinder. In addition, the ECU 30 sends, to the igniter 15 for each cylinder, ignition instructions that instruct the igniter 15 for each cylinder to ignite an air-fuel mixture in each cylinder at a corresponding computed proper ignition timing.

Thereafter, in step S15, the ECU 30 determines whether a present value of the stroke ST of the depressed clutch pedal 17 measured by the clutch sensor 32 is equal to or lower than a threshold value TH2; this threshold value TH2 is set to be lower than the threshold value TH1 (TH2<TH1). The threshold value TH2 is also set relative to a clutch-meet point at which the circular plates 12a and 12b stat to meet (contact) to each other so that power is started to be transferred from the engine 10 to the manual transmission 13 via the clutch 12.

In the first embodiment, the threshold value TH2 is set to be higher than a value of the stroke ST of the depressed clutch pedal 17; this value corresponds to the clutch-meet point. The value of the stroke ST of the depressed clutch pedal 17 corresponding to the clutch-meet point will also be referred to as "clutch-meet point value" hereinafter.

Upon determining that the present value of the stroke ST of the depressed clutch pedal 17 is equal to or lower than the threshold value TH2 (YES in step S15), the ECU 30 proceeds to step S16 and, otherwise (NO in step S15), terminating the engine restart control routine R2. Note that the threshold value TH2 can be set to the clutch-meet point value of the stroke ST of the depressed clutch pedal 17.

In step S16, the ECU 30 measures an elapsed time TX since the determination in step S15 is affirmative (the present value of the stroke ST of the depressed clutch pedal 17 becomes equal to or lower than the threshold value TH2). The elapsed time TX represents a time taken to engage the clutch 12.

In step S17, the ECU 30 determines whether the accelerator pedal 36 is depressed by the driver based on the data measured by the accelerator sensor 31. Upon determining that the accelerator pedal 36 is depressed by the driver (YES in step S17), the ECU 30 proceeds to step S18, and otherwise (NO in step S17), to step S19.

In step S18, the ECU 30 stops the measurement of the elapsed time TX, and terminates the engine restart control routine R2.

That is, when the accelerator pedal 36 is operated by the driver, the engine restart task including the drive of the stator 16, the drive of the injector 14, and the drive of the igniter 15, is continuously carried out by the ECU 30 without being interrupted. In other words, when the accelerator pedal 36 is operated by the driver, the engine restart task is enabled independently of the state of the depressed clutch pedal 17 so that the start of the engine 10 is completed.

In contrast, in step S19, the ECU 30 determines whether a present value of the stroke ST of the depressed clutch pedal 17 measured by the clutch sensor 32 is equal to or lower than a threshold value TH3; this threshold value TH3 is set to be lower than the threshold value TH2 (TH3<TH2). The threshold value TH3 is set to be lower than the threshold value TH2, specifically, to be lower than the clutch-meet point value of the stroke ST of the depressed clutch pedal 17.

Note that, in the first embodiment, the threshold value TH2 corresponds to a first threshold value, the threshold value TH3 corresponds to a second threshold value, and a manipulated variable range from the threshold value TH2 to the threshold value TH3 corresponds to a preset manipulated-variable range.

Upon determining that the present value of the stroke ST of the depressed clutch pedal 17 is higher than the threshold value TH3 (NO in step S19), the ECU 30 terminates the engine restart control routine R2.

Otherwise, upon determining that the present value of the stroke ST of the depressed clutch pedal 17 is equal to or lower than the threshold value TH3 (YES in step S19), the ECU 30 proceeds to step S20 and terminates the measurement of the elapsed time TX in step S20. In step S21, the ECU 30 determines whether the elapsed time TX is lower than a preset threshold value K1 in step S21. Here, the elapsed time TX in step S21 represents a time taken for the stroke ST of the depressed clutch pedal 17 to be shifted from the threshold value TH2 to the threshold value TH3.

Specifically, in step S21, when the elapsed time TX is lower than the threshold value K1 (TX<K1), because the time taken to complete the clutch engagement is relatively short so that the rate of releasing the depressed clutch pedal 17 is relatively high, the ECU 30 estimates that the driver unintentionally releases the clutch pedal 17 without restarting the engine 10.

In contrast, when the elapsed time TX is equal to or higher than the threshold value K1 (TX≧K1), because the time taken to complete the clutch engagement is relatively long so that the rate of releasing the depressed clutch pedal 17 is relatively low, the ECU 30 estimates that the driver intends to carry out the engine restart task, that is, the driver keeps the stroke ST of the depressed clutch pedal 17 within a region in which the clutch 12 is partially engaged (in a half-engaged state).

When the elapsed time TX is equal to or higher than the threshold value K1 (TX≧K1), the ECU 30 terminates the engine restart control routine R2 (NO in step S21). Thus, the engine restart task including the drive of the stator 16, the drive of the injector 14, and the drive of the igniter 15, is continuously carried out by the ECU 30 without being interrupted.

Otherwise, when the elapsed time TX is lower than the threshold value K1 (YES in step S21), the ECU 30 proceeds to step S22.

In step S22, the ECU 30 interrupts the engine restart task being carried out thereby. Specifically, the ECU 30 interrupts the output of the drive signals to the stator 16, the output of the fuel injection instructions to the injector 14 for each cylinder, and the output of the ignition instructions to the igniter 15 therefor. This control interrupts the cranking of the engine 10 by the starter 16, and interrupts the fuel injection and ignition for each cylinder. In step S22, the ECU 30 also outputs, to the brake actuator 28 for each of the wheels, brake instructions that instruct the brake actuator 28 for each wheel to hydraulically apply a braking force to a corresponding wheel to thereby restrict the motion of the vehicle.

Note that, when interrupting the engine restart task, in other words, forcibly terminating the engine restart, the ECU 30 can visually or audibly output information representing that the engine restart is interrupted via a visible and/or audible output device 38. Specifically, the ECU 30 can display a message representing that the engine restart is interrupted on an instrumental panel as an example of the output device 38 and/or display a voice message representing that the engine restart is interrupted by a speaker as an example of the output device 37.

Next, the engine restart control routine R2 set forth above will be graphically described hereinafter.

Figure 3A:
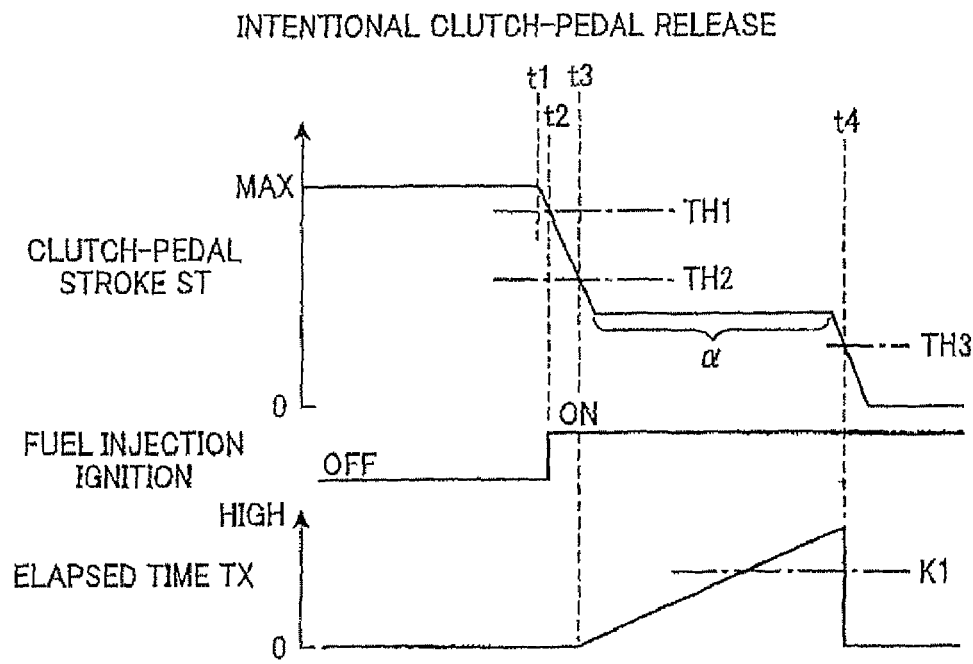
FIG. 3A is a timing chart illustrating the transition of a clutch-pedal stroke and that of an elapsed time when an engine restart task is carried out in response to the driver's intentional release of a depressed clutch pedal illustrated in FIG. 1 according to the first embodiment.
Figure 3B:
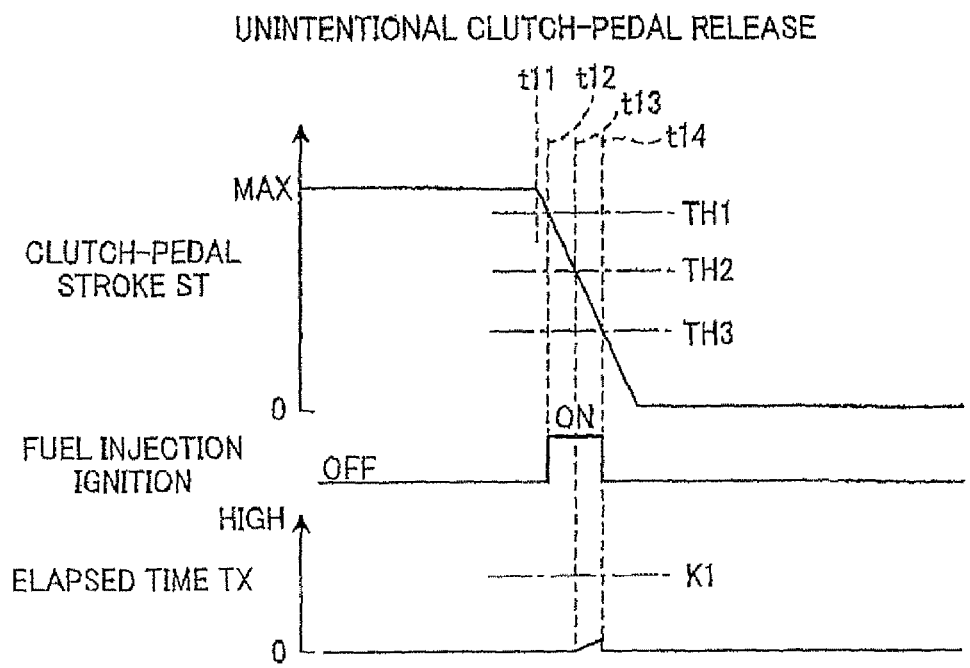
FIG. 3B is a timing chart illustrating the transition of the clutch-pedal stroke and that of the elapsed time when the engine restart according to the driver's unintentional release of the depressed clutch pedal is interrupted according to the first embodiment.

FIG. 3A is a timing chart illustrating the transition of the clutch-pedal stroke ST and that of the elapsed time TX when the engine restart task is carried out in response to the driver's intentional release of the depressed clutch pedal 17, and FIG. 3B is a timing chart illustrating the transition of the clutch-pedal stroke ST and that of the elapsed time TX when the engine restart according to the driver's unintentional release of the depressed clutch pedal 17 is interrupted.

In FIG. 3A, before a timing t1, the engine 10 is automatically stopped and the clutch pedal 17 is fully depressed so that the present value of the stroke ST of the depressed clutch pedal 17 is the maximum value (MAX).

After the timing t1, the depressed clutch pedal 17 is started to be released so that stroke ST of the depressed clutch pedal 17 is reduced. When the stroke ST of the depressed clutch pedal 17 reaches the threshold value TH1 at a timing t2, the engine restart control task is carried out. Specifically, the cranking of the engine 10 is started by the stator 16, the fuel injection is started by the injector 14 for each cylinder, and the ignition is started by the igniter 15 therefor.

Thereafter, the driver's operation of the clutch engagement is carried out so that the clutch 12 is partially engaged. This partial-engagement state (half-engagement state) of the clutch 12 allows the stroke ST of the depressed clutch pedal 17 to be substantially maintained at a constant value during a clutch-engagement period α.

At that time, at a timing t3, because the stroke ST of the depressed clutch pedal 17 reaches the threshold value TH2, the measurement of the elapsed time TX is started. When power transfer is started from the engine 10 to the manual transmission 13 via the clutch 12 within the clutch-engagement period α (clutch 12 is engaged), the vehicle is started in response to the driver's intention. When the stroke ST of the depressed clutch pedal 17 reaches the threshold value TH3 at timing t4, the measurement of the elapsed time TX is terminated. At that time, because the elapsed time TX is equal to or higher than the threshold value K1, it is possible to prevent forcible interruption of the engine restart. Thereafter, when the depressed clutch pedal 17 is completely released, the clutch stroke ST of the clutch pedal 17 becomes zero.

In contrast, in FIG. 3B, before a timing t11, the engine 10 is at a rest and the clutch pedal 17 is fully depressed so that the present value of the stroke ST of the depressed clutch pedal 17 is the maximum value (MAX).

After the timing t11, the depressed clutch pedal 17 is started to be released so that stroke ST of the depressed clutch pedal 17 is reduced. When the stroke ST of the depressed clutch pedal 17 reaches the threshold value TH1 at a timing t12, the engine restart control task is carried out in the same manner in FIG. 3A.

Because FIG. 3B represents some cases where the driver is distracted to unintentionally release the clutch pedal 17, the stroke ST of the depressed clutch pedal 17 is rapidly reduced up to zero without being maintained at a constant value.

The rapid reduction of the stroke ST of the depressed clutch pedal 17 causes, after an elapse of a short time since the timing t12, the stroke ST of the depressed clutch pedal 17 to reach the threshold value TH2 at a timing t13. In addition, the rapid reduction of the stroke ST of the depressed clutch pedal 17 causes, after an elapse of a short time since the timing t13, the stroke ST of the depressed clutch pedal 17 to reach the threshold value TH3 at a timing t14.

This results in that the elapsed-time TX from the timing t13 to the timing t14 becomes shorter than the elapsed time TX from the timing t3 to the timing t4. For this reason, the elapsed time TX in FIG. 3B is lower than the threshold value K1, thus forcibly stopping the engine restart and making the vehicle brake.

As described above, the vehicle control system 1 according to the first embodiment is configured to, after the start of the engine restart task, determine how the clutch pedal 17 is operated from the clutch disengagement state to the clutch engagement state, and to determine whether to enable or disable the engine restart according to how the clutch pedal 17 is operated.

The configuration enables or disables the engine restart on the basis of whether the driver intends to carry out the engine restart task. This result interrupts driver's unintentional engine restarts, thus making engine restarts as effective as possible.

The vehicle control system 1 according to the first embodiment is configured to measure the elapsed time TX taken to engage the clutch 12 during the release of the clutch pedal 17, and to stop (forcibly terminate) the engine restart when the elapsed time TX is lower than a preset value, such as the threshold value K1. The configuration reliably stops the engine restart when the driver's unintentional release of the clutch pedal 17 is rapidly completed. This makes it possible to restart the engine 10 according to the driver's intention.

The vehicle control system 1 according to the first embodiment is configured to measure the elapsed time TX taken to engage the clutch 12 when the stroke ST of the depressed clutch pedal 17 is within the preset manipulated-variable range containing the clutch-meet point from the threshold value TH2 to the threshold value TH3. This configuration easily determines whether the driver intends to restart the engine 10. This is because the rate of releasing the clutch pedal 17 is temporarily slow when the driver intends to restart the engine 10.

it is preferable that the threshold value TH2 defining the preset manipulated-variable range is set to the clutch-meet point value of the stroke ST of the depressed clutch pedal 17. This configuration allows the measurement of the elapsed time TX after the timing when the stroke ST of the depressed clutch pedal 17 reaches the clutch-meet point. Thus, it is possible to more reliably grasp the driver's intention of whether to restart the engine 10.

The vehicle control system 1 according to the first embodiment is configured to enable the engine restart during the clutch pedal 17 being released when the driver depresses the accelerator pedal 36 independently of how the clutch pedal 17 is operated. This makes restart the engine 10 when there is a driver's clear intention to restart the engine 10.

The vehicle control system 1 according to the first embodiment is configured to make the vehicle brake when the engine 10 is restarted according to the driver's unintentional release of the clutch pedal 17. Thus, it is possible to prevent the vehicle from being unexpectedly started when the engine restart is not carried out Second Embodiment A vehicle control system 1A according to the second embodiment of the present invention will be described hereinafter with reference to FIGS. 4 to 6B.

The hardware and software structures of the vehicle control system 1A according to the second embodiment are substantially identical to those of the vehicle control system 1 according to the first embodiment except for the following points. So, like parts between the vehicle control systems 1 and 1A according to the first and second embodiments, to which like reference characters are assigned, are omitted or simplified in description.

As described above, the vehicle control system 1 according to the first embodiment is designed to determine, based on the time taken to engage the clutch 12, how the clutch pedal 17 is operated.

In contrast, the vehicle control system 1A according to the second embodiment is designed to determine, based on a clutch-pedal pressure (foot pressure) of the clutch pedal 17, how the clutch pedal 17 is operated. In addition, the vehicle control system 1A is designed to enable or disable the engine restart according to the amount of change in the clutch-pedal pressure during the depressed clutch pedal 17 being released.

Figure 4:
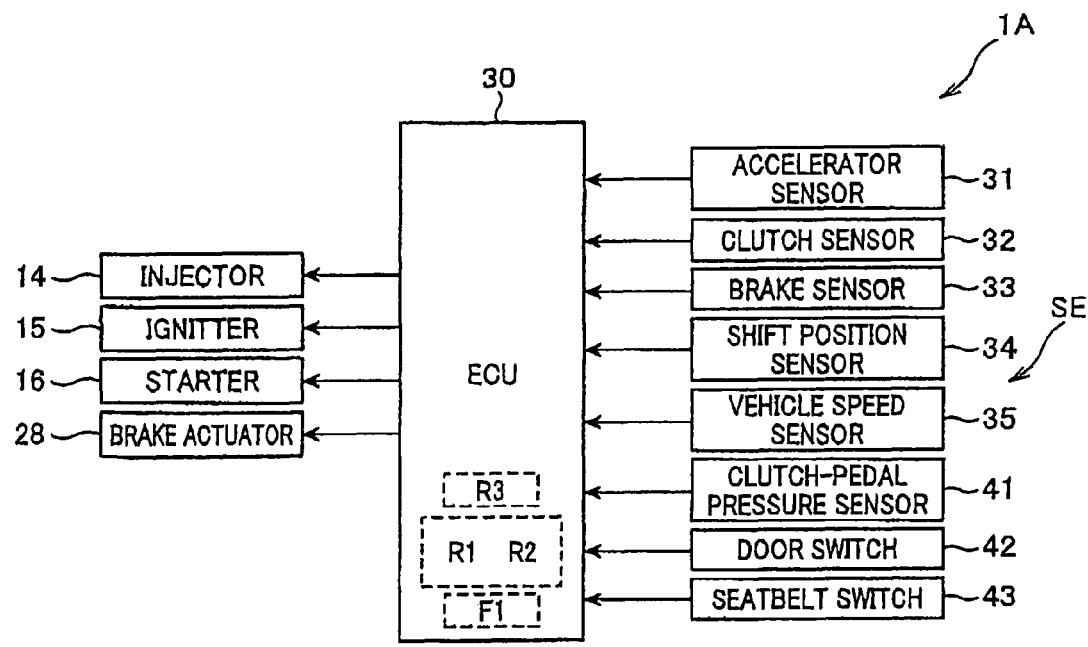
FIG. 4 is a schematic system configuration diagram of a vehicle control system according to the second embodiment of the present invention.
Figure 5:
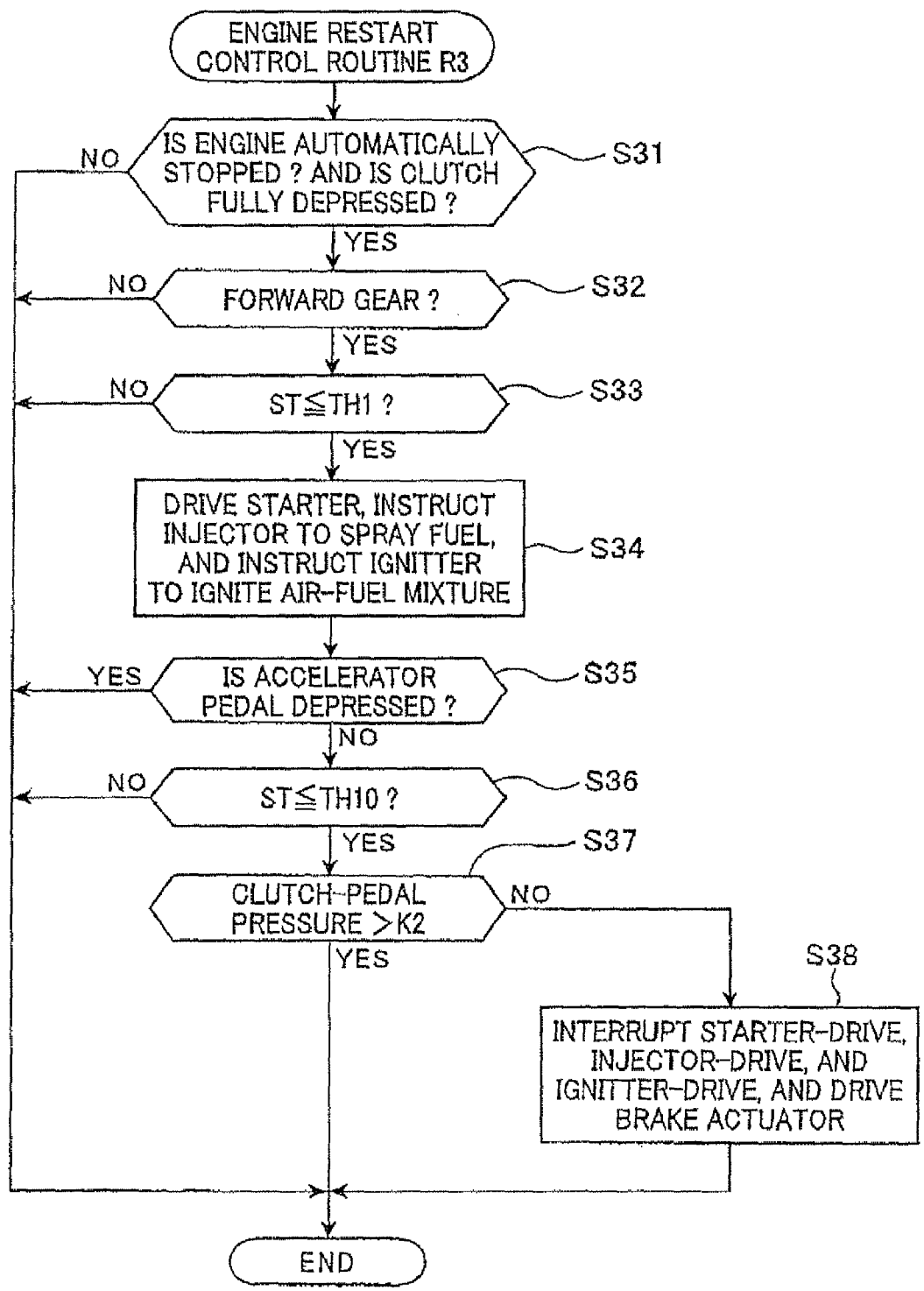
FIG. 5 is a flowchart schematically illustrating an engine restart control routine to be executed by the ECU illustrated in FIG. 4 according to the second embodiment.

Specifically, referring to FIG. 4 corresponding to FIG. 1, in the vehicle control system 1A, the sensors SE include a clutch-pedal pressure sensor 41. The clutch-pedal pressure sensor 41 is operative to measure the hydraulic pressure produced by the clutch actuator 12c and/or the stroke of the piston of the clutch actuator 12c to thereby measure a clutch-pedal pressure due to the driver's depression of the clutch pedal 17. The clutch-pedal pressure sensor 41 is operative to output, to the ECU 30, the measured clutch-pedal pressure as data.

The ECU 30 is programmed to repeatedly run an engine restart control routine R3 different from the engine restart control routine R2 in a given cycle during its being energized.

Specifically, in accordance with the engine restart control routine R3, the ECU 30 executes operations in steps S31 to S34 (see FIG. 4) equivalent to those in steps S11 to S14 illustrated in FIG. 23. These operations S31 to S34 start the engine restart task.

Thereafter, in step S35, the ECU 30 determines whether the driver depresses the accelerator pedal 36 based on the data measured by the accelerator sensor 31. Upon determining that the driver depresses the accelerator pedal 36 (YES in step S35), the ECU 30 terminates the engine restart control task R3.

That is when the accelerator pedal 36 is operated by the driver, the engine restart task, such as the drive of the stator 16, the drive of the injector 14, and the drive of the igniter 15, is continuously carried out by the ECU 30 without being interrupted.

In contrast, upon determining that the driver does not press the accelerator pedal 36 (NO in step S35), the ECU 30 proceeds to step S36.

In step S36, the ECU 30 determines whether a present value of the stroke ST of the depressed clutch pedal 17 measured by the clutch sensor 32 is equal to or lower than a threshold value TH10; this threshold value TH10 is set to be lower than the threshold value TH1 (TH10<TH1). The threshold value TH10 is also set to correspond to or be close to the clutch-meet point value of the stroke ST of the depressed clutch pedal 17. In the second embodiment, the threshold value TH10 is set to correspond to the clutch-meet point value of the stroke ST of the depressed clutch pedal 17.

Upon determining that the present value of the stroke ST of the depressed clutch pedal 17 is equal to or lower than the threshold value TH10 (YES in step S36), the ECU 30 proceeds to step S37 and, otherwise (NO in step S36), terminating the engine restart control routine R3.

In step S37, the ECU 30 determines whether the clutch-pedal pressure measured by the clutch-pedal pressure sensor 41 is higher than a threshold value K2.

Here, the operation in step S37 determines the amount of the clutch-pedal pressure when the stroke ST of the depressed clutch pedal 17 reaches the threshold value TH10.

Specifically, in step S37, when the clutch-pedal pressure is higher than the threshold value K2, the ECU 30 estimates that the driver's engine-restart intention relatively decreases the amount of reduction in the clutch-pedal pressure.

In contrast, when the clutch-pedal pressure is equal to or lower than the threshold value K2, the ECU 30 estimates that the driver's unintentional release of the depressed clutch pedal 17 relatively increases the amount of reduction in the clutch-pedal pressure.

When the clutch-pedal pressure is higher than the threshold value K2, the ECU 30 terminates the engine restart control routine R3. At that time, the engine restart task, such as the drive of the stator 16, the drive of the injector 14, and the drive of the igniter 15, is continuously carried out by the ECU 30 without being interrupted.

Otherwise, when the clutch-pedal pressure is equal to or lower than the threshold value K2, the ECU 30 estimates that the driver does not intend to restart the engine 10, that is, the ECU 30 proceeds to step S38.

In step S38, the ECU 30 interrupts the engine restart task being carried out thereby. This operation is identical to that in step S22.

In addition, the ECU 30 outputs, to the brake actuator 28 for each of the wheels, brake instructions that instruct the brake actuator 28 for each wheel to hydraulically apply a braking force to a corresponding wheel to thereby restrict the motion of the vehicle.

Next, the engine restart control routine R3 set forth above will be graphically described hereinafter.

Figure 6A:
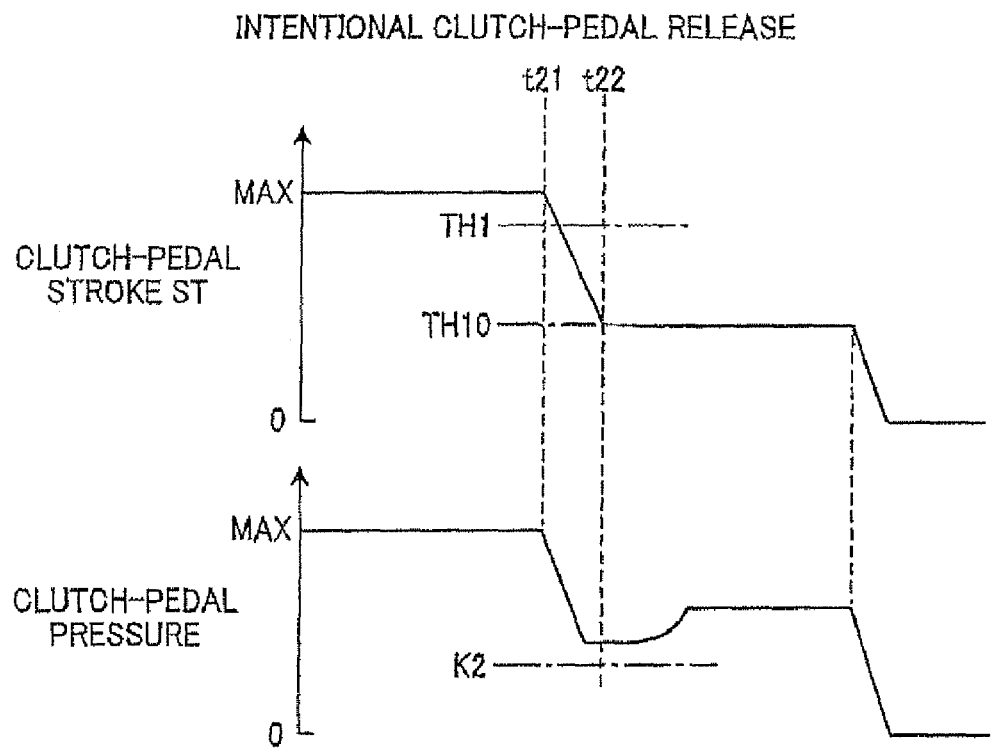
FIG. 6A is a timing chart illustrating the transition of the clutch-pedal stroke and that of a clutch-pedal pressure when the engine restart task is carried out in response to the driver's intentional release of the depressed clutch pedal according to the second embodiment.
Figure 6B:
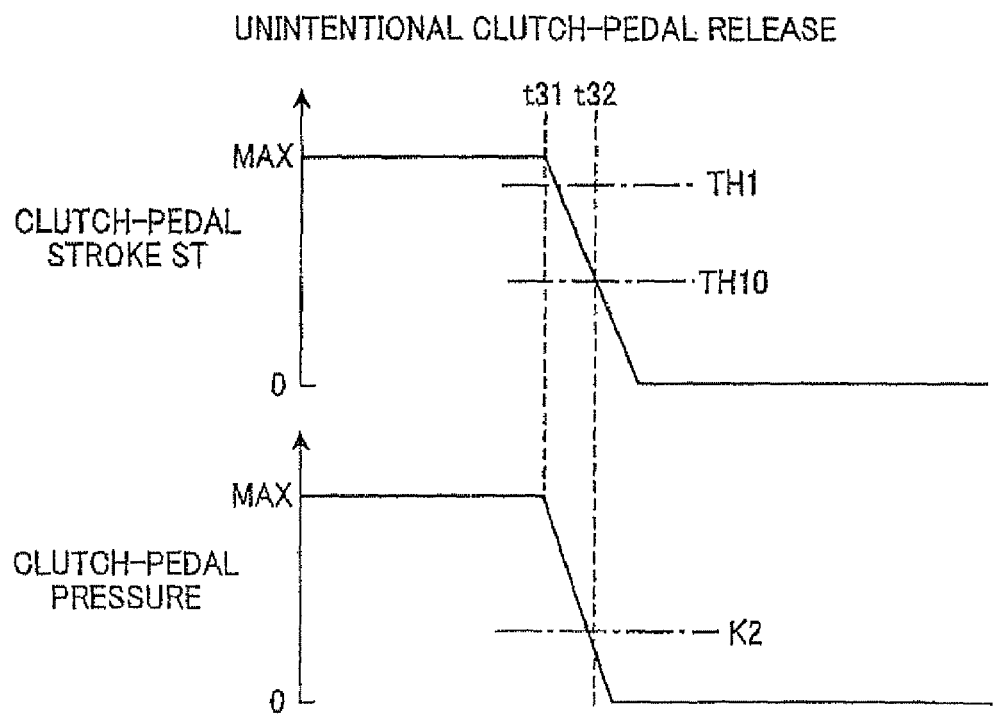
FIG. 6B is a timing chart illustrating the transition of the clutch-pedal stroke and that of the clutch-pedal pressure when the engine restart according to the driver's unintentional release of the depressed clutch pedal is interrupted according to the second embodiment.

FIG. 6A is a timing chart illustrating the transition of the clutch-pedal stroke ST and that of the clutch-pedal pressure when the engine restart task is carried out in response to the driver's intentional release of the depressed clutch pedal 17; this figure is similar to FIG. 3A. FIG. 6B is a timing chart illustrating the transition of the clutch-pedal stroke ST and that of the clutch-pedal pressure when the engine restart according to the driver's unintentional release of the depressed clutch pedal 17 is interrupted; this figure is similar to FIG. 3B.

In FIG. 6A, after a timing t21, when the stroke ST of the depressed clutch pedal 17 decreases up to the threshold value TH1, the engine restart control task is carried out. After the timing t21, the clutch-pedal pressure also decreases.

Thereafter, the driver's operation of the clutch engagement is carried out so that the clutch 12 is partially engaged. This half-engagement state of the clutch 12 allows the stroke ST of the depressed clutch pedal 17 to be substantially maintained at a constant value.

At a timing t22 when the stroke ST of the depressed clutch pedal 17 reaches the threshold value TH10, because the clutch-pedal pressure is higher than the threshold value K2, the engine restart control task is continued so that no forcible interruptions of the engine restart are carried out. Thereafter, when the depressed clutch pedal 17 is completely released, the clutch stroke ST of the clutch pedal 17 becomes zero.

In contrast, in FIG. 6B, after a timing t31, when the stroke ST of the depressed clutch pedal 17 decreases up to the threshold value TH1, the engine restart control task is carried out.

However, because FIG. 6B represents some cases where the driver is distracted to unintentionally release the clutch pedal 17, at a timing t32 when the stroke ST of the depressed clutch pedal 17 reaches the threshold value TH10, because the clutch-pedal pressure is equal to or lower than the threshold value K2, the engine restart control task is forcibly stopped.

As described above, the vehicle control system 1A according to the second embodiment is configured to interrupt driver's unintentional engine restarts, thus making engine restarts as effective as possible.

The vehicle control system 1A according to the second embodiment is configured to measure the change in the clutch-pedal pressure measured during the clutch pedal 17 being released, and to stop (forcibly terminate) the engine restart when the amount of reduction in the clutch-pedal pressure is equal to or lower than a preset value, such as the threshold value K2. The configuration reliably stops the engine restart when the driver's unintentional release of the clutch pedal 17 is rapidly completed. This makes it possible to restart the engine 10 according to the driver's intention.

The vehicle control system 1A according to the second embodiment is configured to determine, during the clutch pedal 17 being released, whether to enable or disable the engine restart according to the clutch-pedal pressure measured when the stroke ST of the depressed clutch pedal 17 reaches the clutch-meet point or thereabout. This configuration easily determines whether the driver intends to restart the engine 10. This is because the rate of reduction in the clutch-pedal force is temporarily slow when the driver intends to restart the engine 10.

Note that, during the clutch pedal 17 being operated by the driver, the vehicle control system 1A can be configured to disable the engine restart when detecting driver's operations except for driver's operations required to drive the vehicle.

Specifically, the vehicle control system 1A can be configured to detect, as the driver's operations except for driver's operations required to drive the vehicle, that a door of the vehicle is opened or a seatbelt for the driver seat is unbuckled. For example, referring to FIG. 4, the vehicle control system 1A can be provided with a door switch 42 attached to, for example, each door of the vehicle. The door switch 42 is operative to detect the opening of a corresponding door and output a signal indicative of the door opening to the ECU 30. The vehicle control system 1A can also be provided with a seatbelt switch 43 attached to, for example, each seatbelt of a corresponding one of the seats of the vehicle. The seatbelt switch is operative to detect that the corresponding seatbelt is unbuckled and output a signal indicative of the unbuckle of the corresponding seatbelt. The door switch 42 and the seatbelt switch 43 correspond to driver's operation detecting means.

The ECU 30 has a function F1 of:

determining whether a door of the vehicle is opened and/or the driver's seatbelt is unbuckled based on the signals outputted from the door and seatbelt switches 42 and 43; and forcibly stopping the engine restart when it is determined that a door of the vehicle is opened and/or the driver's seatbelt is unbuckled even if the clutch 12 is partially engaged.

This configuration reduces unintentional engine restarts (unintentional starts of the vehicle) when it is estimated that the driver does not intend to start the vehicle because of detecting at least one of the driver's operations except for the driver's operations required to drive the vehicle.

Third Embodiment

A vehicle control system according to the third embodiment of the present invention will be described hereinafter with reference to FIGS. 7A and 7B.

The hardware and software structures of the vehicle control system according to the third embodiment are substantially identical to those of the vehicle control system 1 according to the first embodiment except for the following points. So, like parts between the vehicle control systems according to the first and third embodiments, to which like reference characters are assigned, are omitted or simplified in description.

As described above, the vehicle control system 1 according to the first embodiment is designed to set the threshold value TH2 to be higher than the clutch-meet point value of the stroke ST of the depressed clutch pedal 17. The vehicle control system 1 according to the first embodiment is also designed to set the threshold value TH3 to be lower than the clutch-meet point value of the stroke ST of the depressed clutch pedal 17.

In contrast, the vehicle control system according to the third embodiment is configured to:

set the threshold values TH2 and TH3 to be higher than the clutch-meet point value of the Stroke ST of the depressed clutch pedal 17 and different from each other. Note that each of the threshold values TH2 and TH3 can be determined independently of the threshold value TH1. That is, each of the threshold values TH1 and TH3 can be set to be lower or higher than the threshold value TH1, or any one of the threshold values TH2 and TH3 can be set to be equal to the threshold value TH1.

Next, the engine restart control routine according to the third embodiment will be graphically described hereinafter with reference to FIGS. 7A and 7B.

Figure 7A:
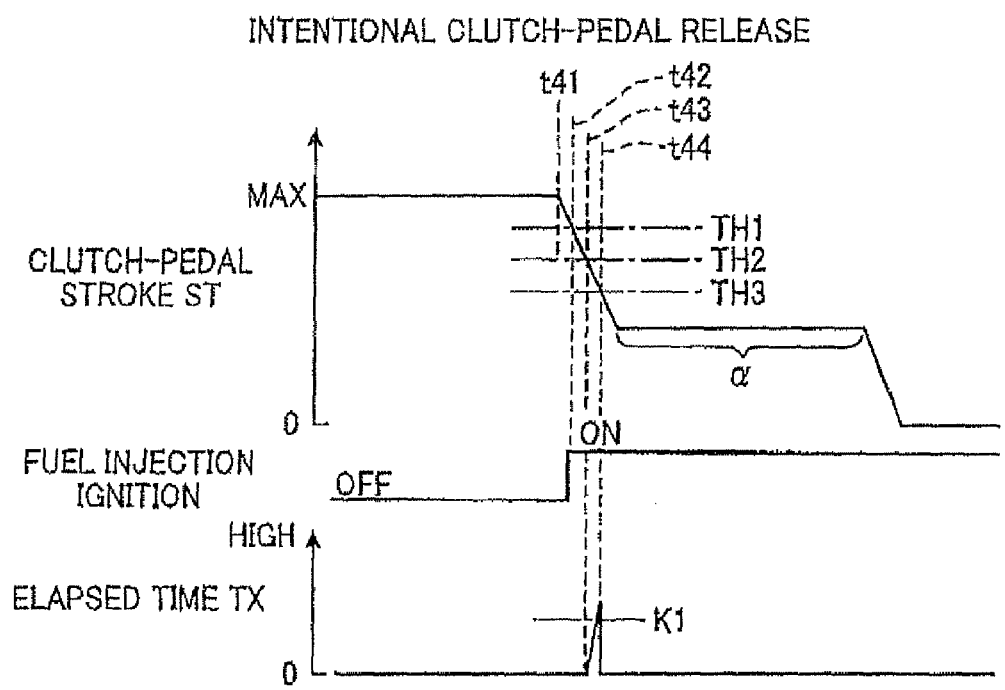
FIG. 7A is a timing chart illustrating the transition of the clutch-pedal stroke and that of the elapsed time when the engine restart task is carried out in response to the driver's intentional release of the depressed clutch pedal according to the third embodiment of the present invention.

FIG. 7A is a timing chart illustrating the transition of the clutch-pedal stroke ST and that of the elapsed time TX when the engine restart task is carried out in response to the driver's intentional release of the depressed clutch pedal 17; this transition of the clutch-pedal stroke ST is substantially identical to that illustrated in FIG. 3A. The transition of the clutch-pedal stroke ST illustrated in FIG. 7B has a gradient more steeply than that of the transition of the clutch-pedal stroke ST illustrated in FIG. 7A. That is, the stroke of the depressed clutch pedal illustrated in FIG. 7A is illustrated by two-dot chain line. In FIG. 7B, each of the threshold values TH2 and TH3 is set to be lower than the threshold value TH1.

In FIG. 7A, before a timing t41, the engine 10 is at a rest and the clutch pedal 17 is fully depressed so that the present value of the stroke ST of the depressed clutch pedal 17 is the maximum value (MAX).

After the timing t41, the depressed clutch pedal 17 is started to be released so that stroke ST of the depressed clutch pedal 17 is reduced. When the stroke ST of the depressed clutch pedal 17 reaches the threshold value TH1 at a timing t42, the engine restart control task is carried out. Thereafter, at a timing t43, because the stroke ST of the depressed clutch pedal 17 reaches the threshold value TH2, the measurement of the elapsed time TX is started. Thereafter, when the stroke ST of the depressed clutch pedal 17 reaches the threshold value TH3 at timing t44, the measurement of the elapsed time TX is terminated.

At that time, because the elapsed time TX is equal to or higher than the threshold value K1, it is possible to prevent forcible interruption of the engine restart. Thereafter, the driver's operation of the clutch engagement is carried out so that the clutch 12 is partially engaged. This half-engagement state of the clutch 12 allows the stroke ST of the depressed clutch pedal 17 to be substantially maintained at a constant value during a clutch-engagement period $\alpha$.

When power transfer is started from the engine 10 to the manual transmission 13 via the clutch 12 within the clutch-engagement period $\alpha$ (clutch 12 is engaged), the vehicle is started in response to the driver's intention. Thereafter, when the depressed clutch pedal 17 is completely released, the clutch stroke ST of the clutch pedal 17 becomes zero.

Figure 7B:
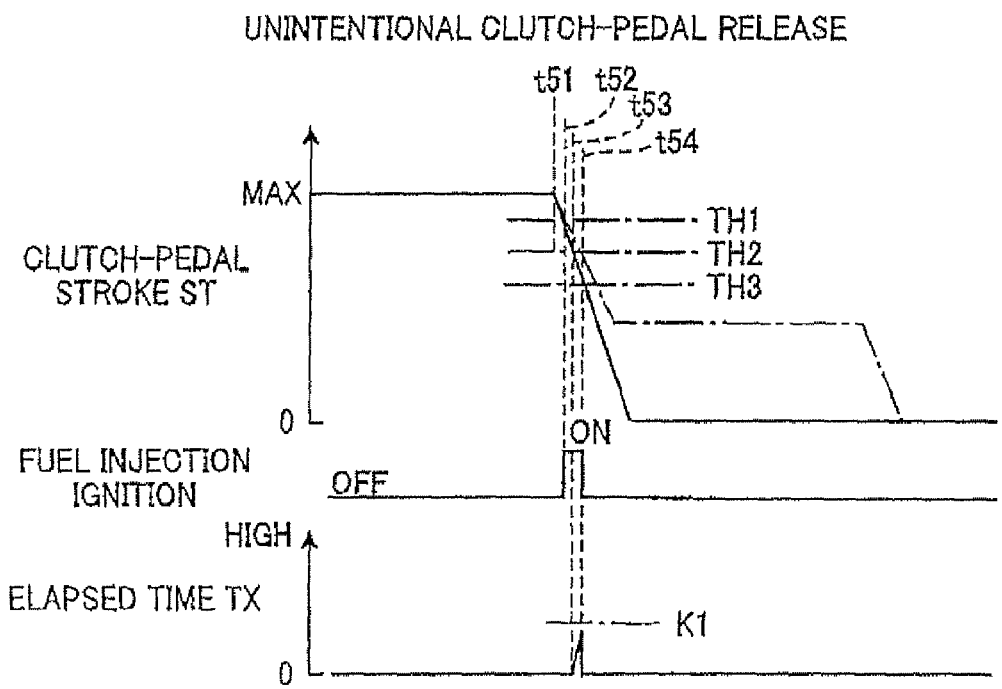
FIG. 7B is a timing chart illustrating the transition of the clutch-pedal stroke and that of the clutch-pedal pressure when the engine restart according to the driver's unintentional release of the depressed clutch pedal is interrupted according to the third embodiment.

In contrast, in FIG. 7B, before a timing t51, the engine 10 is at a rest and the clutch pedal 17 is fully depressed so that the present value of the stroke ST of the depressed clutch pedal 17 is the maximum value (MAX).

After the timing t51, the depressed clutch pedal 17 is started to be released so that the stroke ST of the depressed clutch pedal 17 is reduced. When the stroke ST of the depressed clutch pedal 17 reaches the threshold value TH1 at a timing t52, the engine restart control task is carried out in the same manner in FIG. 7A.

Because FIG. 7B represents some cases where the driver is distracted to unintentionally release the clutch pedal 17 so that the driver does not release the depressed clutch pedal 17 up to a target value of the stroke ST of the depressed clutch pedal 17, the stroke ST of the depressed clutch pedal 17 is rapidly reduced up to zero without being maintained at a constant value.

Note that, when the clutch pedal 17 is unintentionally released by the driver, a biasing force of a return spring (not shown) rapidly returns the clutch pedal 17 to an original position corresponding to a position where the depression of the clutch pedal 17 is completely released; this position corresponds to zero of the stroke of the clutch pedal 17.

Thus, the amount $\Delta ST$ of change in the stroke ST of the clutch pedal 17 per unit time during the clutch pedal 17 being unintentionally released by the driver is greater than the amount ΔST of change in the stroke ST of the clutch pedal 17 per unit time during the clutch pedal 17 being released by the driver up to a preset target value of the stroke ST in order to carry out the engine restart task.

These results reduce the elapsed time TX representing a time taken for the stroke ST of the depressed clutch pedal 17 to be shifted from the threshold value TH2 to the threshold value TH3; this elapsed time TX is a time from the timing t53 to the timing t54 illustrated in FIG. 7B. Thus, the elapsed time TX from the timing t53 to the timing t54 becomes shorter than the elapsed time TX from the timing t43 to the timing t44. For this reason, the elapsed time TX in FIG. 7B is lower than the threshold value K1, thus forcibly stopping the engine restart and making the vehicle brake.

As described above, the vehicle control system according to the third embodiment is configured to interrupt driver's unintentional engine restarts, thus making engine restarts as effective as possible.

The vehicle control system according to the third embodiment is configured to determine how the clutch pedal 17 is operated according to the time taken to engage the clutch 12 within a preset manipulated-variable range of the stroke ST of the clutch pedal 17; this preset manipulated-variable range is higher than the clutch-meet point. The vehicle control system according to the third embodiment is also configured to determine whether to enable the engine restart or disable the engine restart task based on a result of the determination of how the clutch pedal 17 is operated.

This configuration forcibly stops, as rapidly as possible, the engine restart that is started independently of the driver's intention. This result makes it possible to effectively reduce unexpected starts of the vehicle when the driver does not intend to restart the engine 10.

Fourth Embodiment

Figure 9:
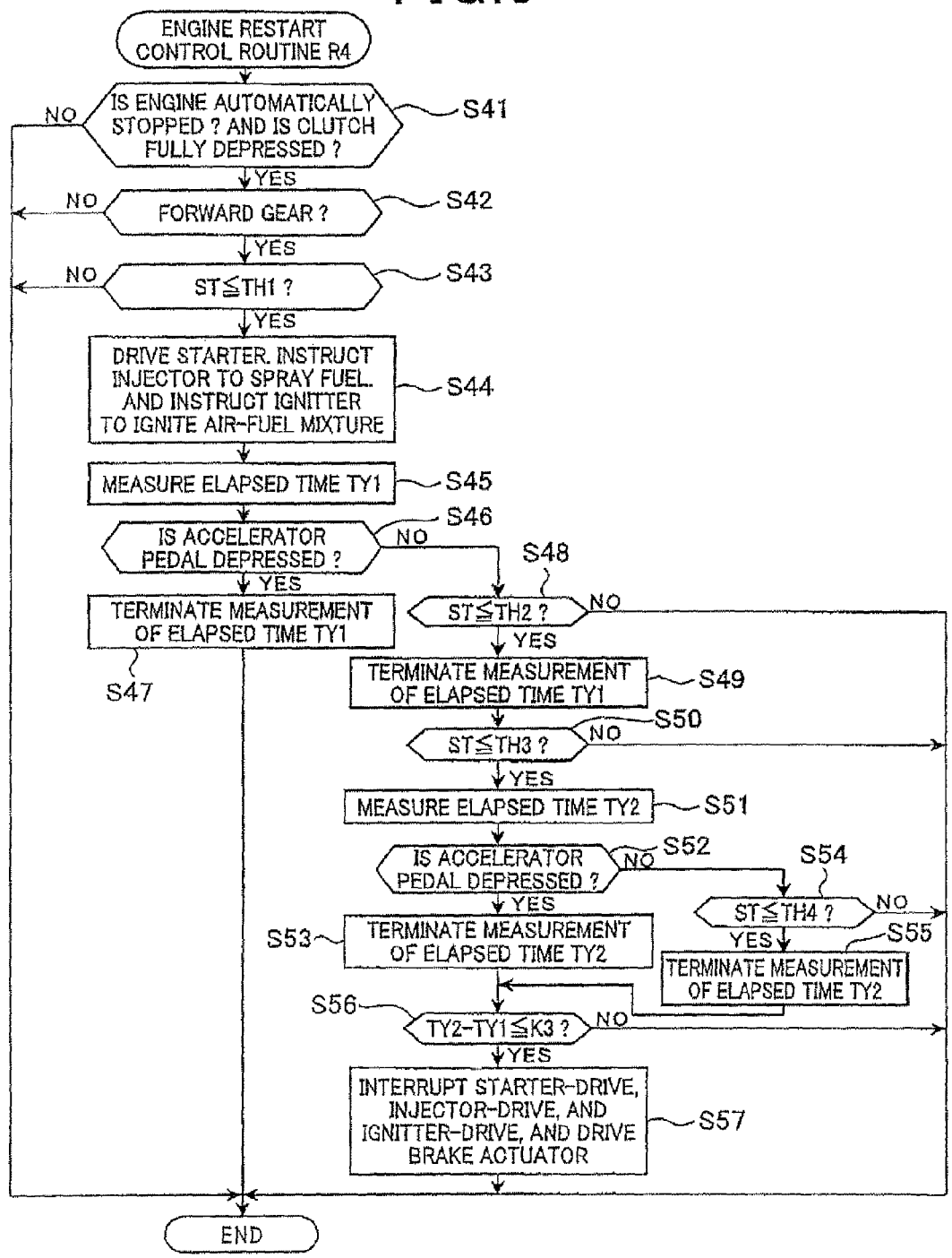
FIG. 9 is a flowchart schematically illustrating an engine restart control routine to be executed by the ECU according to the fourth embodiment.

A vehicle control system according to the fourth embodiment of the present invention will be described hereinafter with reference to FIGS. 8A to 9.

The hardware and software structures of the vehicle control system according to the fourth embodiment are substantially identical to those of the vehicle control system 1 according to the first embodiment except for the following points. So, like parts between the vehicle control systems according to the first and fourth embodiments, to which like reference characters are assigned, are omitted or simplified in description. As described above, the vehicle control system 1 according to the first embodiment is designed to determine, based on the time taken to engage the clutch 12, how the clutch pedal 17 is operated.

In contrast, the vehicle control system according to the fourth embodiment is designed to determine how the clutch pedal 17 is operated according to the change in the rate of release of the depressed clutch pedal 17. Specifically, the vehicle control system is designed to detect a value of the rate of release of the depressed clutch pedal 17 at each of different timings within a preset manipulated-variable range of the stroke ST of the clutch pedal 17; this preset manipulated-variable range is higher than the clutch-meet point The vehicle control system is also designed to detect the change in the rate of release of the depressed clutch pedal 17 according to the detected values of the rate of release of the depressed clutch pedal 17 at the respective timings.

More specifically, the preset manipulated-variable range higher than the clutch-meet point contains a first manipulated-variable range of the stroke ST of the clutch pedal 17 and a second manipulated-variable range thereof. The first manipulated-variable range is set to be higher than clutch-meet point, and the second manipulated-variable range is set to be higher than the clutch-meet point and than the first manipulated-variable range.

The vehicle control system according to the fourth embodiment is designed to detect the time taken to engage the clutch 12 within each of the first and second manipulated-variable ranges, and to monitor the change in the rate of release of the clutch pedal 17. In addition, the vehicle control system according to the fourth embodiment is designed to determine whether to enable and disable the engine restart according to the monitored change in the rate of release of the clutch pedal 17.

The engine restart control routine based on the change in the rate of release of the depressed clutch pedal 17 according to the fourth embodiment will be graphically described hereinafter with reference to FIGS. 8A and 8B.

FIG. 8A is a timing chart illustrating the transition of the clutch-pedal stroke ST and that of each of the elapsed times when the engine restart task is carried out in response to the driver's intentional release of the depressed clutch pedal 17. FIG. 8B is a timing chart illustrating the transition of the clutch-pedal stroke ST and that of each of the elapsed times when the engine restart is carried out according to the driver's unintentional release of the depressed clutch pedal 17, such as the driver's unintentional foot-slip from the clutch pedal 17.

The amount of change in the stroke of the depressed clutch pedal 17 illustrated in FIG. 8A is basically identical to that illustrated in FIG. 3A except that the change in the clutch-pedal stroke ST is gradually reduced with change in the actual stroke of the clutch pedal 17. The change in the stroke ST of the depressed clutch pedal 17 illustrated in FIG. 8B is substantially identical to that illustrated in. FIG. 3B.

Note that, in FIGS. 8A and 8B, the threshold values TH1 to TH4 are each set to be higher than the clutch-meet point value of the clutch-pedal stroke ST. The threshold value TH1 is set to be the highest in the threshold values TH1 to TH4, and the threshold value TH4 is set to be the lowest in them. The range from the threshold value TH1 to the threshold value TH2 is set to be the first manipulated-variable range, and the range from the threshold value TH3 to the threshold value TH4 is set to be the second manipulated-variable range. The stroke length of the first manipulated-variable range and that of the second manipulated-variable range are set to be identical to each other. Note that, in the fourth embodiment, one of the border values of the first manipulated-variable range is set to be the threshold value TH1, but can be set to another value.

When releasing the fully depressed clutch pedal 17 with an intention to restart the engine 10, the driver releases the clutch pedal 17 up to the clutch-meet point value of the clutch-pedal stroke ST so that the clutch 12 is partially engaged (in a half-engaged state).

For this reason, as illustrated in FIG. 8A, as the clutch-pedal stroke ST approaches, the clutch-meet point, the change in the rate of release of the clutch pedal 17 is gradually slowed. That is, when the driver releases the fully depressed clutch pedal 17 with an intention to restart the engine 10, the rate of release of the clutch pedal 17 is changed with change in an elapsed time since the start of the release. Specifically, the rate of release of the clutch pedal 17 at its early stage is high, but the rate of release of the clutch pedal 17 at a stage close to the clutch-meet point is low.

In contrast, when releasing the fully depressed clutch pedal 17 without an intention to restart the engine 10, the driver releases the clutch pedal 17 without intending to set the clutch 12 to be partially engaged (in a half-engaged state). For this reason, when the depressed clutch pedal 17 is released, the biasing force of the return spring rises rapidly. Thus, as illustrated in FIG. 8B, the amount ΔST of change in the stroke ST of the clutch pedal 17 per unit time during the clutch pedal 17 being unintentionally released by the driver, in other words, the rate of release of the depressed clutch pedal 17 is maintained at a substantially constant level until the depression of the clutch pedal 17 is completely released since the start of the release.

The vehicle control system according to the fourth embodiment is designed to use the characteristics of the rate of release of the clutch pedal 17 to thereby determine whether to enable or disable the engine restart.

Specifically, in FIG. 8A, before a timing t61, the engine 10 is automatically stopped and the clutch pedal 17 is fully depressed so that the present value of the stroke ST of the depressed clutch pedal 17 is the maximum value (MAX).

After the timing t61, the depressed clutch pedal 17 is started to be released so that stroke ST of the depressed clutch pedal 17 is reduced. When the stroke ST of the depressed clutch pedal 17 reaches the threshold value TH1 at a timing t62, the engine restart control task is carried out. At the timing t62, the measurement of an elapsed time TY1 is started.

Thereafter, at a timing t63, the measurement of the elapsed time TY1 is terminated. In addition, when the stroke ST of the depressed clutch pedal 17 reaches the threshold value TH3 at a timing t64, the measurement of an elapsed time TY2 is started.

At a timing t65, when the stroke ST of the depressed clutch pedal 17 reaches the threshold value TH4, the measurement of an elapsed time TY2 is terminated. At that time, as a result of the comparison between the elapsed time TY1 and the elapsed time TY2, the elapsed time TY2 is longer than the elapsed time TY1 so that the change in the rate of release of the clutch pedal 17 becomes high. In this case, it is possible to prevent the engine restart from being forcibly interrupted.

Thereafter, the driver's operation of the clutch engagement is carried out so that the clutch 12 is partially engaged. This half-engagement state of the clutch 12 allows the stroke ST of the depressed clutch pedal 17 to be substantially maintained at a constant value during a clutch-engagement period α.

When power transfer is started from the engine 10 to the manual transmission 13 via the clutch 12 within the clutch-engagement period α (clutch 12 is engaged), the vehicle is started in response to the driver's intention. Thereafter, when the depressed clutch pedal 17 is completely released, the clutch stroke ST of the clutch pedal 17 becomes zero.

In contrast, in FIG. 8B, before a timing t71, the engine 10 is automatically stopped and the clutch pedal 17 is fully depressed so that the present value of the stroke ST of the depressed clutch pedal 17 is the maximum value (MAX).

After the timing t71, the depressed clutch pedal 17 is started to be released so that the stroke ST of the depressed clutch pedal 17 is reduced. When the stroke ST of the depressed clutch pedal 17 reaches the threshold value TH1 at a timing t72, the engine restart control task is carried out in the same manner in FIG. 8A.

Because FIG. 8B represents some cases where the driver is distracted to unintentionally release the clutch pedal 17, the stroke ST of the depressed clutch pedal 17 is rapidly reduced up to zero without being maintained at a constant value.

That is, the stroke ST of the clutch pedal 17 is changed while the rate of release of the depressed clutch pedal 17 is maintained at a substantially constant level until the depression of the clutch pedal 17 is completely released since the start of the release.

Thus, the elapsed time TY1 from when the clutch-pedal stroke ST reaches the threshold value TH1 at the timing t72 to when the clutch-pedal stroke ST reaches the threshold value TH2 at a timing t73 is in agreement with the elapsed time TY2 from when the clutch-pedal stroke ST reaches the threshold value TH3 at a timing t74 to when the clutch-pedal stroke ST reaches the threshold value TH4 at a timing t75. Each of the elapsed time TY1 and the elapsed time TY2 is set to a time TC. This is results in that the engine restart task is forcibly stopped.

The ECU 30 is programmed to repeatedly run an engine restart control routine R4 different from the engine restart control routine R2 in a given cycle during its being energized.

Figure 2B:
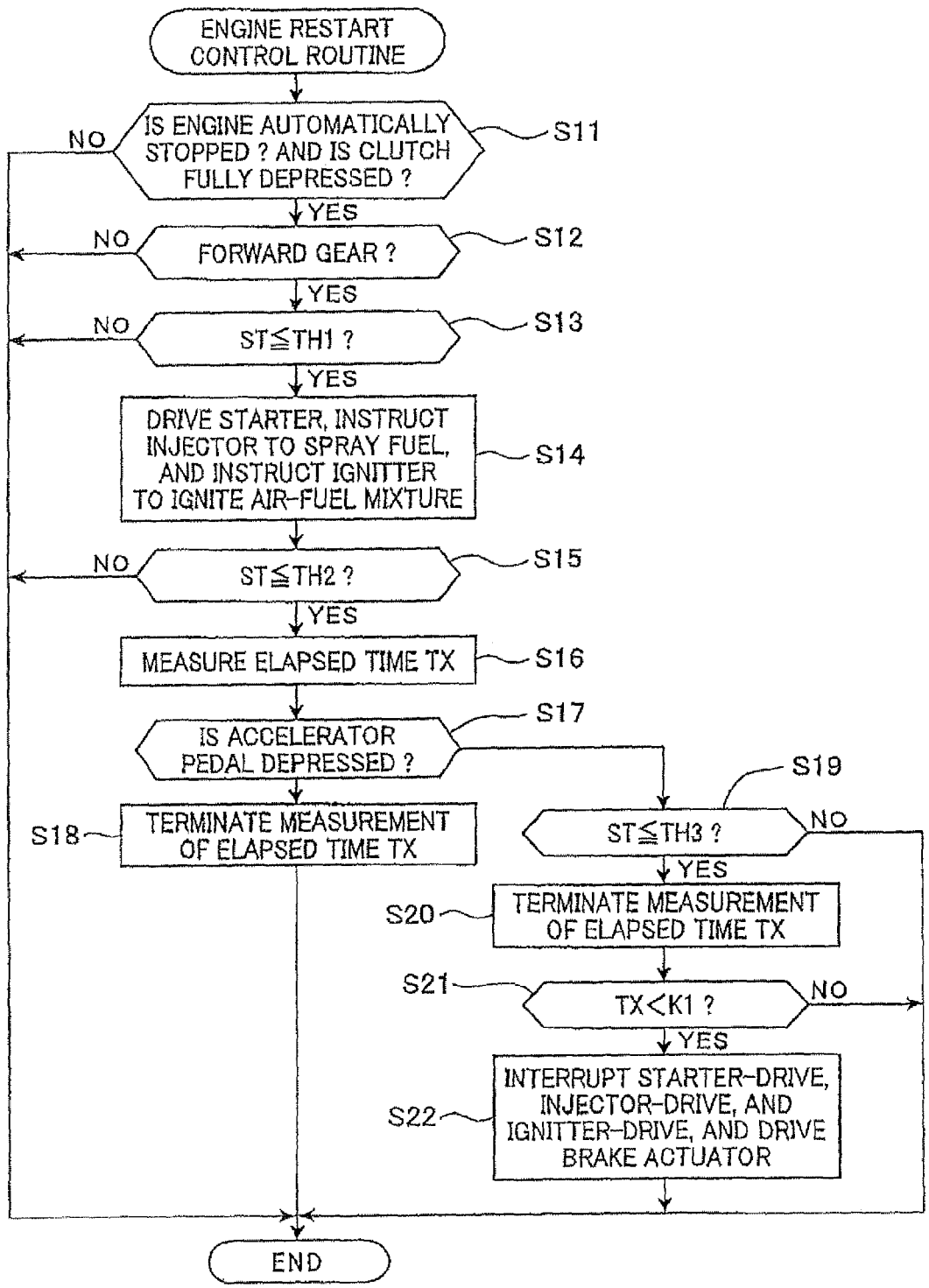
FIG. 2B is a flowchart schematically illustrating an engine restart control routine to be executed by the ECU according to the first embodiment.

Specifically, in accordance with the engine restart control routine R4, the ECU 30 executes operations in steps S41 to S44 (see FIG. 9) equivalent to those in steps S11 to S14 illustrated in FIG. 2B. These operations S41 to S44 start the engine restart task.

In step S45, the ECU 30 measures the elapsed time TY1 since the determination in step S43 is affirmative (a present value of the stroke ST of the depressed clutch pedal 17 becomes equal to or lower than the threshold value TH1). The elapsed time TY1 represents a time taken to engage the clutch 12 within the first manipulated-variable range.

Thereafter, in step S46, the ECU 30 determines whether the driver depresses the accelerator pedal 36 based on the data measured by the accelerator sensor 31. Upon determining that the driver depresses the accelerator pedal 36 (YES in step S46), the ECU 30 proceeds to step S47, and otherwise (NO in step S46), to step S48.

In step S47, the ECU 30 stops the measurement of the elapsed time TY1, and terminates the engine restart control routine R4.

That is, when the accelerator pedal 36 is operated by the driver, the engine restart task, such as the drive of the stator 16, the drive of the injector 14, and the drive of the igniter 15, is continuously carried out by the ECU 30 without being interrupted. In other words, when the accelerator pedal 36 is operated by the driver, the engine restart task is enabled independently of the state of the depressed clutch pedal 17 so that the start of the engine 10 is completed.

In contrast, in step S48, the ECU 30 determines whether a present value of the stroke ST of the depressed clutch pedal 17 measured by the clutch sensor 32 is equal to or lower than the threshold value TH2.

Upon determining that the present value of the stroke ST of the depressed clutch pedal 17 is higher than the threshold value TH2 (NO in step S48), the ECU 30 terminates the engine restart control routine R4.

Otherwise, upon determining that the present value of the stroke ST of the depressed clutch pedal 17 is equal to or lower than the threshold value TH2 (YES in step S48), the ECU 30 proceeds to step S49. In step S49, the ECU 30 terminates the measurement of the elapsed time TY1, and stores the elapsed time TY1 in the storage medium 30a.

In step S50, the ECU 30 determines whether a present value of the stroke ST of the depressed clutch pedal 17 measured by the clutch sensor 32 is equal to or lower than the threshold value TH3.

Upon determining that the present value of the stroke ST of the depressed clutch pedal 17 is higher than the threshold value TH3 (NO in step S50), the ECU 30 terminates the engine restart control routine R4.

Otherwise, upon determining that the present value of the stroke ST of the depressed clutch pedal 17 is equal to or lower than the threshold value TH3 (YES in step S50), the ECU 30 proceeds to step S51.

In step S51, the ECU 30 measures the elapsed time TY2 since the determination in step S50 is affirmative (the present value of the stroke ST of the depressed clutch pedal 17 becomes equal to or lower than the threshold value TH3). The elapsed time TY2 represents a time taken to engage the clutch 12 within the second manipulated-variable range.

Thereafter, in step S52, the ECU 30 determines whether the driver depresses the accelerator pedal 36 based on the data measured by the accelerator sensor 31. Upon determining that the driver depresses the accelerator pedal 36 (YES in step S52), the ECU 30 proceeds to step S53, and otherwise (NO in step S52), to step S54.

In step S53, the ECU 30 stops the measurement of the elapsed time TY2, and terminates the engine restart control routine R4.

That is when the accelerator pedal 36 is operated by the driver, the engine restart task, such as the drive of the stator 16, the drive of the injector 14, and the drive of the igniter 15, is continuously carried out by the ECU 30 without being interrupted. In other words, when the accelerator pedal 36 is operated by the driver, the engine restart task is enabled independently of the state of the depressed clutch pedal 17 so that the start of the engine 10 is completed.

In contrast, in step S54, the ECU 30 determines whether a present value of the stroke ST of the depressed clutch pedal 17 measured by the clutch sensor 32 is equal to or lower than the threshold value TH4.

Upon determining that the present value of the stroke ST of the depressed clutch pedal 17 is higher than the threshold value TH4 (NO in step S54), the ECU SO terminates the engine restart control routine 124.

Otherwise, upon determining that the present value of the stroke ST of the depressed clutch pedal 17 is equal to or lower than the threshold value TH4 (YES in step S54), the ECU 30 proceeds to step S55. In step S55, the ECU 30 terminates the measurement of the elapsed time TY2, and stores the elapsed time TY2 in the storage medium 30a.

In step S56, the ECU 30 reads, from the storage medium 30a, the elapsed time TY1 and the elapsed time TY2 stored therein, and calculates the subtraction of the elapsed time TY1 from the elapsed time TY2 to thereby calculate the difference $\Delta TY = TY2 - TY1$.

In step S56, the ECU 30 determines whether the difference $\Delta TY = TY2 - TY1$ is equal to or lower than a preset threshold value K3.

Specifically, in step S56, when the difference $\Delta TY$ is equal to or lower than the threshold value K3 ($\Delta TY \leq K3$), because the change in the rate of release of the clutch pedal 17 over time is relatively short, the ECU 30 estimates that the driver has no intention to restart the engine 10, in other words, the driver unintentionally releases the clutch pedal 17.

In contrast, when the difference $\Delta TY$ is higher than the threshold value K3 ($\Delta TY > K3$), because the change in the rate of release of the clutch pedal 17 over time is relatively high, the ECU 30 estimates that the driver intends to restart the engine 10, in other words, the driver releases the clutch pedal 17 so that the clutch 12 is partially engaged.

When the difference $\Delta TY$ is equal to or lower than the threshold value K3 ($\Delta TY \leq K3$), the ECU 30 proceeds to step S57 (YES in step S56). Otherwise, when the difference $\Delta TY$ is higher than the threshold value K3 ($\Delta TY > K3$), the ECU 30 terminates the engine restart control routine R4 (NO in step S56).

When the difference $\Delta TY$ is higher than the threshold value K3 ($\Delta TY > K3$), the engine restart task, such as the drive of the stator 16, the drive of the injector 14, and the drive of the igniter 15, is continuously carried out by the ECU 30 without being interrupted.

In step S57, the ECU 30 interrupts the engine restart task being carried out thereby. Specifically, the ECU 30 interrupts the output of the drive signals to the stator 16, the output of the fuel injection instructions to the injector 14 for each cylinder, and the output of the ignition instructions to the igniter 15 therefor. This control interrupts the cranking of the engine 10 by the starter 16, and interrupts the fuel injection and ignition for each cylinder. In step S57, the ECU 30 also outputs, to the brake actuator 28 for each of the wheels, brake instructions that instruct the brake actuator 28 for each wheel to hydraulically apply a braking force to a corresponding wheel to thereby restrict the motion of the vehicle.

As described above, the vehicle control system according to the fourth embodiment is configured to interrupt driver's unintentional engine restarts, thus making engine restarts as effective as possible.

In addition, the vehicle control system according to the fourth embodiment is configured to determine whether to enable or disable the engine restart according to the change in the rate of release of the clutch pedal 17. This configuration properly determines whether or not a present release of the depressed clutch pedal 17 is based on the driver's intention. This proper determination effectively restarts the engine 10 in response to the driver's intention of restarting the engine 10.

The vehicle control system according to the fourth embodiment is configured to detect a value of the rate of release of the depressed clutch pedal 17 at each of timings, such as two timings in the fourth embodiment, within a preset manipulated-variable range of the stroke ST of the clutch pedal 17; this preset manipulated-variable range is higher than the clutch-meet point. This configuration determines whether the release of the depressed clutch pedal 17 is based on the driver's intention before the clutch-pedal stroke ST reaches the clutch-meet point value. This determination forcibly stops properly the engine restart task started independently of the driver's intention as rapidly as possible. The configuration also properly detects the change in the rate of release of the clutch pedal 17 according to the values of the rate of release of the clutch pedal 17 at the respective different timings.

In the first embodiment, the vehicle control system 1 detects the elapsed time TX taken to engage the clutch 12 as the operated state of the clutch pedal 17, but the present invention is not limited thereto. For example, the ECU 30 can detect the amount $\Delta ST$ of change in the stroke ST of the clutch pedal 17 per unit time during the clutch pedal 17 being released. In this modification, it is preferable that the ECU 30 detects the amount $\Delta ST$ of change in the stroke ST of the clutch pedal 17 per unit time when a present value of the stroke ST is positioned at the clutch-meet point value or thereabout.

Specifically, in this modification, when the amount $\Delta ST$ of change in the stroke ST of the clutch pedal 17 per unit time is lower than a preset value, the ECU 30 enables (continues) the engine restart task, and when the amount $\Delta ST$ of change in the stroke ST of the clutch pedal 17 per unit time is higher than the preset value, the ECU 30 disables (forcibly stops) the engine restart. The latter case corresponds to a short-time operation of the clutch pedal 17. Note that, when the depressed clutch pedal 17 is unintentionally released by the driver, the releasing operation of the clutch pedal 17 becomes short, but the amount $\Delta ST$ of change in the clutch-pedal stroke ST becomes great. For this reason, the amount $\Delta ST$ of change in the clutch-pedal stroke ST correlates to the elapsed time TX, and therefore, it corresponds to a correlation value of the elapsed time TX.

During the depressed clutch pedal 17 being released, the ECU 30 can detect that the clutch 12 is partially engaged as the operated state of the clutch 12, and can stop the engine restart when it does not detect that the clutch 12 is partially engaged. For example, when a present value of the clutch-pedal stroke ST is maintained around the clutch-meet point value so that the operated state of the clutch pedal 17 or the clutch 12 is maintained, the ECU 30 can detect that the clutch 12 is partially engaged (in a half-engagement state).

In addition, the ECU 30 can determine that the clutch 12 is partially engaged (in a half-engagement state) based on the elapsed time taken to engage the clutch 12 or the amount of change in the clutch-pedal stroke ST.

In the first embodiment, a single threshold value can be used as both the threshold value TH1 for determining whether at least one of the engine restart conditions is met and the threshold value TH2 for determining the start of the measurement of the elapsed time associated with the clutch engagement. Specifically, the ECU 30 can be configured to determine, based on the single threshold value, whether at least one of the engine restart conditions is met and whether the measurement of the elapsed time TX is started.

In each of the first to fourth embodiments, the clutch sensor 32 is used to detect the clutch-pedal operated position (clutch-pedal stroke), but the present invention is not limited to the structure. For example, at least one clutch switch can be used to change the logical level of its output each time the clutch-pedal operated position reaches a preset position (preset stroke). When this modification is applied to the first embodiment, the first, second, and third clutch switches are used. The first switch can change the logical level of its output from Low to High when the clutch-pedal stroke ST reaches the threshold value TH1. The second switch can change the logical level of its output from. Low to High when the clutch-pedal stroke ST reaches the threshold value TH2. The third switch can change the logical level of its output from Low to High when the clutch-pedal stroke ST reaches the threshold value TH3.

In each of the first to fourth embodiments, the ECU 30 outputs, to the brake actuator 28 for each of the wheels, brake instructions that instruct the brake actuator 28 for each wheel to hydraulically apply a braking force to a corresponding wheel when interrupting the engine restart, but the ECU 30 cannot output the brake instructions. In addition, the ECU 30 can carry out the engine restart task without stopping the ignition.

In the second embodiment, the threshold value TH10 for determining, based on the clutch-pedal pressure, whether the driver has an, intention to restart the engine 10 can be set to be higher than the clutch-meet point value. In this modification, the threshold value TH10 can be set to be higher or lower than the threshold value TH1. When the driver has no intention to restart the engine 10, because the fully depressed clutch pedal 17 is rapidly released, the clutch-pedal pressure is low at the early stage of the release of the clutch pedal 17 in comparison to when the driver has an intention to restart the engine 10.

Thus, even if the threshold value TH10 is set to be higher than the clutch-meet point value, it is possible to reliably stop the engine restart when the depressed clutch pedal 17 is rapidly released without the driver's intention to restart the engine 10.

Particularly, this modification determines the disabling of the engine restart task when the driver has no intention to restart the engine 10 before the clutch-meet point. Thus, it is possible to more effectively prevent the vehicle from unintentionally starting when the driver has no intention to restart the engine 10.

Whether the driver has an intention to restart the engine 10 can be determined based on the change in the clutch-pedal pedal pressure. For example, an amount of change in the clutch-pedal pressure per unit time can be detected based on the clutch-pedal pressure at each of different timings. According to the amount of change in the clutch-pedal pressure per unit of time, whether the engine restart task is enabled or disabled can be determined. In this modification, when the amount of change in the clutch-pedal pressure per unit time is lower than a predetermined threshold value, the engine restart task is enabled, and when the amount of change in the clutch-pedal pressure per unit time is higher than the predetermined threshold value, the engine restart task is disabled.

In the fourth embodiment, the elapsed time TY1 is measured as a time taken to engage clutch 12 within the first manipulated-variable range, and the elapsed time TY2 is measured as a time taken to engage clutch 12 within the second manipulated-variable range. The comparison between the elapsed time TY1 and the elapsed time TY2 detects the change in the rate of release of the depressed clutch pedal 17, but the present invention is not limited to the method.

Specifically, the ECU 30 can detect the clutch-pedal, stroke ST relative to an elapsed time since the start of the release of the depressed clutch pedal 17, and can calculate the rate of release of the clutch pedal 17 according to a relationship between the clutch-pedal stroke ST and the elapsed time, thus detecting the change in the rate of release of the clutch pedal 17.

In the fourth embodiment, the elapsed time TY1 is measured as a time taken to engage clutch 12 within the first manipulated-variable range, and the elapsed time TY2 is measured as a time taken to engage clutch 12 within the second manipulated-variable range; these first and second manipulated-variable ranges are contained in the preset manipulated-variable range higher than the clutch-meet point. According to a result of the measurements, how the clutch 12 is operated is determined, but the present invention is not limited thereto.

Specifically, three or more elapsed times within three or more manipulated-variable ranges contained in the preset manipulated-variable range higher than the clutch-meet point can be measured, and according to a result of the measurements, the operated state of the clutch 12 can be determined.

Fifth Embodiment

A vehicle control system according to the fifth embodiment of the present invention will be described hereinafter with reference to FIGS. 10 and 11.

The hardware and software structures of the vehicle control system according to the fifth embodiment are substantially identical to those of the vehicle control system 1 according to the first embodiment except for the following points. So, like parts between the vehicle control systems according to the first and fifth embodiments, to which like reference characters are assigned, are omitted or simplified in description.

In the fifth embodiment, the predetermined engine restart conditions include, in addition to the release of the brake pedal 37 and the depression of the accelerator pedal 36, the depression of the clutch pedal 17 and there is an amount of release of the depressed clutch pedal 17; this amount is equal to or greater than a preset amount of clutch-pedal release.

When the system restarts the engine 10 on condition that the clutch pedal 17 is depressed, that is, fully depressed, the system may restart the engine 10 without the driver's intention of restarting the engine 10.

For example, while the engine 10 is automatically stopped with the clutch pedal 17 being free (not depressed), the driver may depress the clutch pedal 17 for preparation of the next start of the vehicle even if there are no events that cause the driver to have an intention of restarting the engine 10; these events include an event that a signal red light is changed to a signal green light.

In such a case, when the system restarts the engine 10 immediately in response to the depression of the clutch pedal 17, the engine 10 is restarted independently of the driver's intention. This may restart the engine 10 before a driver's restart request, making it difficult to sufficiently improve fuel efficiency.

In addition, when the system restarts the engine 10 on condition that the clutch pedal 17 is fully released so that the clutch 12 is completely engaged, the engine 10 may be restarted even if the driver intends to release the depressed clutch pedal 17 with the neutral position being selected by the manual transmission 13 so as to park the vehicle.

Moreover, as described in the first embodiment, when the engine 10 is restarted on condition that the driver releases (for example, starts the release of) the fully depressed clutch pedal 17, the following problems may appear.

Specifically, when the driver moves the foot fully depressing the clutch pedal 17 or changes the driver's position so as to unintentionally reduce slightly the amount of depression of the clutch pedal 17, the restart of the engine 10 may be carried out independently of the driver's intention. This unintended restart of the engine 10 may cause unexpected engine stalling, cause the occupants to be shocked or to feel uncomfortable, and/or unintentionally start the vehicle.

In order to address the problems due to the unintentional engine restart set forth above, the inverters have completed one aspect of the present invention by focusing the fact that, during the engine 10 being automatically stopped, when the driver has an intention to restart the engine 10, after the driver has depressed the clutch pedal 17 fully, the driver releases the fully depressed clutch pedal by a preset amount or over reflected by the driver's intention.

For example, during the engine 10 being automatically stopped, when the driver has an intention to restart the engine 10, after the driver has depressed the clutch pedal 17 fully, the driver releases the clutch pedal up to the clutch-meet point at which power is started to be transferred from the engine 10 to the manual transmission 13 via the clutch 12.

Specifically, the vehicle control system according to the fifth embodiment is configured to restart the engine 10 when the amount of depression of the clutch pedal 17 is higher than a first threshold value TH21, and thereafter, is lower than a second threshold value TH22 lower than the first threshold TH21. In addition, the second threshold value TH22 is set to be higher than an amount of depression of the clutch pedal 17 corresponding to the clutch-meet point.

An engine restart control routine (program) R5 included in the engine control programs stored in the storage medium 30a is configured to implement the specific feature set forth above. The ECU 30 repeatedly runs the engine restart control routine R5 in a given cycle during its being energized.

Specifically, in accordance with the engine restart control routine R5, the ECU 30 determines whether the engine 10 is automatically stopped (burning is stopped) in step S61.

Upon determining that the engine 10 is automatically stopped (YES in step S61), the ECU 30 proceeds to step S62, and otherwise (NO in step S61), the ECU 30 exits the engine restart control routine R5.

In step S62, the ECU 30 determines whether a determination flag F1 is set to a bit of 1.

Upon determining that the determination flag F1 is set to a bit of 1 (YES in step S62), the ECU 30 goes to step S66, and otherwise (NO in step S62), the ECU 30 proceeds to step S53.

In step S63, the ECU 30 determines whether a present value of the stroke ST of the clutch pedal 17 measured by the clutch sensor 32 is higher than the first threshold value TH21.

Note that the determination flag F1 is a flag representing that the amount of depression of the clutch pedal 17 during the engine 10 being automatically stopped is higher than the first threshold value TH21. That is, when the amount of depression of the clutch pedal 17 during the engine 10 being automatically stopped is higher than the first threshold value TH21, the determination flag F1 is set to a bit of 1. The first threshold value TH21 is a value representing that the clutch pedal 17 is sufficiently depressed. For example, the first threshold value TH21 is set to be a value, such as 80% in proximity to the maximum value (100%) of the clutch-pedal stroke ST corresponding to the fully depressed position of the clutch pedal 17.

That is, when the driver sufficiently depresses the clutch pedal 17 from its free state or lightly depressed, the preset value of the stroke ST of the depressed clutch pedal 17 measured by the clutch sensor 32 is higher than the threshold value TH21 (YES in step S63).

In step S64, the ECU 30 determines whether the actual selected gear position of the manual transmission 13 is set to be any position other than the neutral position.

When the affirmative determinations are carried out in steps S63 and S64, the ECU 30 proceeds to step S65 and sets the determination flag F1 to 1 in step S65, proceeding to step S66. Otherwise, the negative determination is carried out in at least one of steps S63 and S64, the ECU 30 terminates the engine restart control routine R5.

For example, after the automatic stop of the engine 10, when the driver greatly depresses the clutch pedal 17 from its free state so that the clutch-pedal, stroke ST exceeds over the first threshold value TH21, the ECU 30 carries out an affirmative determination, proceeding to step S66.

In step S66, the ECU 30 determines whether a present value of the stroke ST of the clutch pedal 17 measured by the clutch sensor 32 is lower than the second threshold value TH22.

Note that the second threshold value TH22 is a value lower than the first threshold value TH21 and higher than the clutch-meet point value. More specifically, the second threshold value TH22 is set to be a value; this value allows the ECU 30 to determine that the release of the clutch pedal 17 is not carried out even if the driver re-depresses the foot on the clutch pedal 17 or changes the driver's position after the full depression of the clutch pedal 17. For example, the second threshold value TH22 is set to be close to the clutch-meet point value, such as 60% of the clutch-pedal stroke ST, or to be slightly depressed relative to the clutch-meet point value.

In the fifth embodiment, the second threshold TH22 is determined in consideration of the fact that a time is required from when at least one of the engine restart conditions is met, in other words, an engine restart request occurs to when the engine 10 is actually restarted. Specifically, when the time required to actually restart the engine 10 is longer than a time required for the clutch pedal 17 to shift from the second threshold value TH22 to the clutch-meet point value, the clutch 12 may be engaged before restart of the engine 10.

In order to prevent the clutch 12 from being engaged before restart of the engine 10, the second threshold value TH22 is set to be higher than the clutch-meet point value; this allows the engine 10 is restarted when the stroke ST of the clutch pedal 17 reaches the clutch-meet point value. More specifically, the second threshold TH22 is determined such that the time required to restart the engine 10 in response to the occurrence of an engine restart request is longer than the time required for the clutch-pedal stroke ST shifts from the second threshold value TH22 to the clutch-meet point value.

In other words, the second threshold value TH22 is determined such that a torque created by the engine 10 when the stroke ST of the clutch pedal 17 reaches the clutch-meet point is matched with a torque required to restart the engine 10, in other words, to rotate the output shaft 11 at an idle speed.

More particularly, the second threshold value TH22 is determined such that the rotational speed of the engine 10 reaches a value, such as an idle speed, required to restart the engine 10 during the clutch pedal 17 being operated from the second threshold value TH22 to the clutch-meet point value.

When the clutch pedal 17 is returned from its fully depressed position (maximum value of the clutch-pedal stroke ST) by the driver so that the clutch pedal 17 passes through a depressed position corresponding to the second threshold value TH22 of the clutch-pedal stroke ST, an affirmative determination is carried out in step S66. Thus, an execution point of the ECU 30 is shifted to step S69.

In step S69, the ECU 30 carries out an engine restart task in the same manner as the operation in step S14 in FIG. 2B. Specifically, when the release of the fully depressed clutch pedal 17 is not carried out or the amount of release of the fully depressed clutch pedal 17 is small after the automatic stop of the engine 10, the ECU 30 estimates that the driver does not intend to restart the engine 10, thus preventing the restart of the engine 10.

In contrast, when the clutch pedal 17 is released to the clutch-meet point value or therearound with the actual selected gear position of the manual transmission 13 being set to be any position other than the neutral position, the ECU 30 estimates that the driver intends to restart the engine 10, thus restarting the engine 10.

In the fifth embodiment, after the clutch pedal 17 has been fully depressed, when the accelerator pedal 36 is depressed or the brake pedal 37 is released, the ECU 30 estimates that the driver intends to restart the engine 10, thus restarting the engine 10.

Specifically, when the present value of the stroke ST of the clutch pedal 17 measured by the clutch sensor 32 is equal to or higher than the second threshold value TH22 (NO in step S66), the ECU 30 determines whether the depressed brake pedal 37 is released by the driver based on the data measured by the brake sensor 33 in step S67.

Upon determining that the depressed brake pedal 37 is released by the driver (YES in step 67), the ECU 30 proceeds to step S69, and carries out the engine restart task described above. That is, when the depressed brake pedal 37 is released during the clutch pedal 17 being released from its fully depressed position, the ECU 30 determines that the driver has an intention to restart the engine 10 even if the clutch-pedal stroke ST passes through the second threshold TH22, thus carrying out the engine restart task.

Otherwise, upon determining that the depressed brake pedal 37 is not released by the driver (NO in step 67), the ECU 30 proceeds to step S68 and determines whether the amount of depression of the accelerator pedal 36 measured by the accelerator sensor 31 is shifted from zero to a value higher than zero, in other words, whether the accelerator pedal 36 is depressed by the driver in step S68.

Upon determining that the accelerator pedal 36 is depressed by the driver (YES in step S68), the ECU 30 proceeds to step S69, and carries out the engine restart task described above. That is, when the accelerator pedal 36 is depressed during the clutch pedal 17 being released from its fully depressed position, the ECU 30 determines that the driver has an intention to restart the engine 10 even if the clutch-pedal stroke ST passes through the second threshold TH22, thus carrying out the engine restart task.

Next, the engine restart control routine R5 set forth above will be graphically described hereinafter with reference to the following timing chart of FIG. 11.

Figure 11:
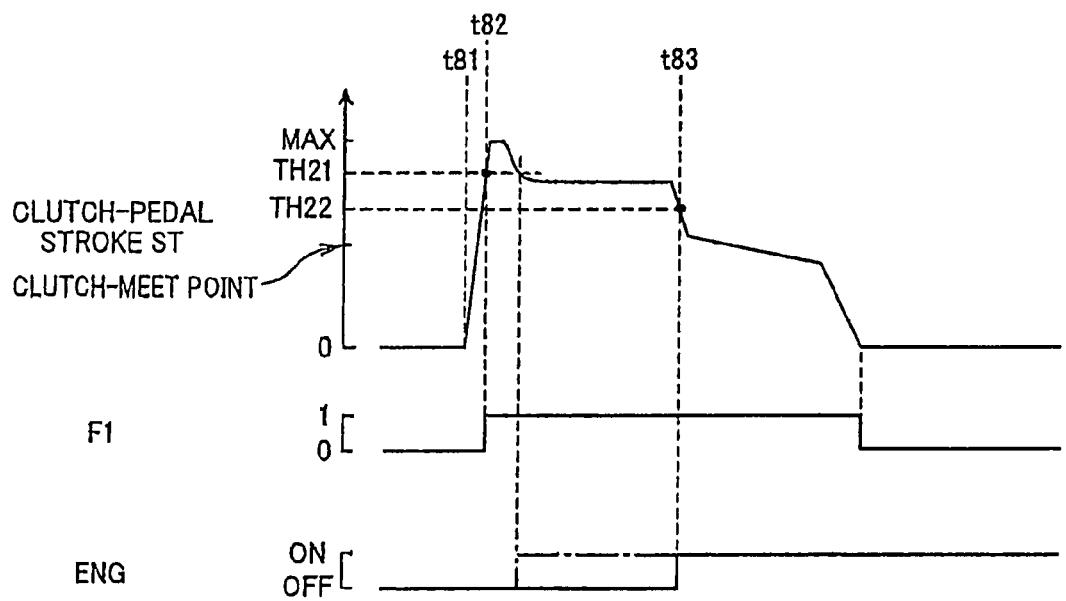
FIG. 11 is a timing chart illustrating the transition of the clutch-pedal stroke and the engine restart timing according to the fifth embodiment.

In FIG. 11, before a timing t81, the engine 10 is automatically stopped and the clutch pedal 17 is free.

After the timing t81, the clutch pedal 17 is started to be depressed so that stroke ST of the depressed clutch pedal 17 is increased. When the stroke ST of the depressed clutch pedal 17 exceeds the threshold value, TH21 at a timing t82, the determination flag F1 is set to 1.

Thereafter, the driver's operation of the clutch engagement is carried out so that, when the stroke ST of the clutch pedal 17 is reduced to become lower than the second threshold TH22 at a timing t83, the engine restart control task is carried out (see "ON" in FIG. 11). Specifically, the cranking of the engine 10 is started by the stator 16, the fuel injection is started by the injector 14 for each cylinder, and the ignition is started by the igniter 15 therefor.

Thus, during the clutch pedal 17 being depressed from the timing t82 to the timing t83, even if the clutch stroke ST is slightly reduced due to the change in the driver's position or the like, it is possible to prevent the engine 10 from being restarted. In contrast, when the engine 10 is programmed to be restarted on condition that the release of the clutch pedal 17 is started, if the driver had no intention to restart the engine 10, the engine restart task would be carried out (see long dashed and short dashed line).

Note that a timing at which the determination flag F1 is reset to zero can not be limited. Specifically, when the amount of depression of the clutch pedal 17 reaches zero, the determination flag F1 can be reset to zero, or when the engine 10 will be automatically stopped next, the determination flag F1 can be reset to zero.

As described above, the vehicle control system according to the fifth embodiment is configured to restart the engine 10 when, after the clutch pedal 17 has been deeply depressed over the threshold value TH21, the clutch-pedal stroke ST becomes lower than the second threshold value TH22. This configuration determines whether or not the engine 10 is restarted according to the determination of whether or not the driver has an intention to restart the engine 10. In addition, the second threshold value TH22 is set to be higher than the clutch-meet point value. This prevents the clutch 12 from being engaged before the restart of the engine 10, making it possible to reduce shocks for the occupants due to the engine restart.

In addition, the vehicle control system according to the fifth embodiment is configured to meet the driver's engine-restart intention before the clutch-pedal stroke ST reaches the clutch-meet point value to thereby restart the engine 10 as rapidly as possible. Thus, it is possible to implement engine restarts in response to the driver's engine-restart intentions, making engine restarts as effective as possible.

The second threshold TH22 is determined such that the rotational speed of the engine 10 reaches a value required to restart the engine 10 during the clutch pedal 17 being operated from the second threshold value TH22 to the clutch-meet point value. In addition, the second threshold TH22 is determined such that the time required to restart the engine 10 in response to the occurrence of an engine restart request is longer than the time required for the clutch-pedal stroke ST shifts from the second threshold value TH22 to the clutch-meet point value.

This determination prevents the clutch 12 from being engaged before the engine 10 is actually restarted. Thus, it is possible to reduce the driver's expected shocks for the occupants due to the engine restart.

The vehicle control system according to the fifth embodiment is configured to restart the engine 10 when, before the clutch-pedal stroke ST passes through the second threshold TH22, the accelerator pedal 36 is operated. This configuration allows the engine 10 to be restarted an response to the driver's clear intention to start the vehicle.

The vehicle control system according to the fifth embodiment is configured to restart the engine 10 when, before the clutch-pedal stroke ST passes through the second threshold TH22, the brake pedal 37 is released. This configuration allows the engine 10 to be restarted in response to the driver's clear intention to start the vehicle.

Sixth Embodiment

A vehicle control system according to the sixth embodiment of the present invention will be described hereinafter with reference to FIGS. 12 to 14.

The hardware structure of the vehicle control system according to the sixth embodiment is substantially identical to that of the vehicle control system 1 according to the first embodiment. So, like parts between the vehicle control systems according to the first and sixth embodiments, to which like reference characters are assigned, are omitted or simplified in description.

The software structure of the vehicle control system according to the sixth embodiment is substantially identical to that of the vehicle control system according to the fifth embodiment except for the following points. So, like parts between the vehicle control systems according to the fifth and sixth embodiments are omitted or simplified in description.

As described above, the vehicle control system according to the fifth embodiment is configured to, after the clutch pedal 17 is fully depressed, carry out the engine restart task when the clutch-engagement operation is continued until the clutch-pedal stroke ST reaches the second threshold value TH22.

On the other hand, the vehicle control system according to the sixth embodiment is configured to change how to carry out the engine restart task according to the behavior of the clutch pedal 17 after the clutch pedal 17 has been sufficiently depressed.

In restarting the engine 10, in order to reliably restart the engine 10 and give the driver engine-restart feeling, the vehicle control system according to the sixth embodiment can control the engine 10 such that a torque created by the engine 10 immediately after the engine has been started is temporarily greater than a torque created by the engine 10 being in idle (the throttle valve is fully closed).

Figure 12:
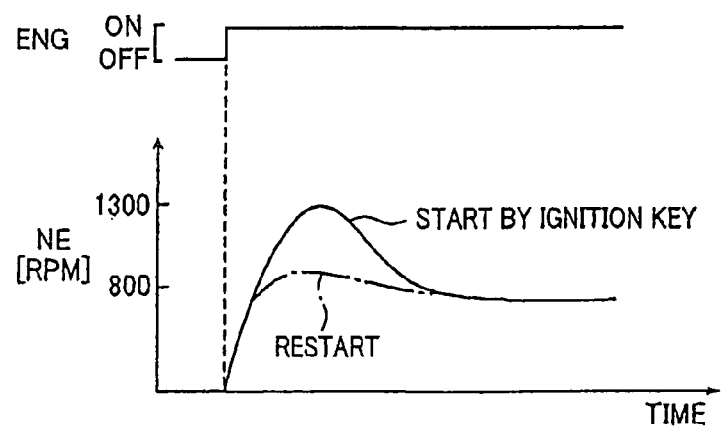
FIG. 12 is a timing chart schematically illustrating the transition of a rotational speed of the engine after the engine is restarted.

FIG. 12 is a timing chart schematically illustrating the transition of the rotational speed NE of the engine 10, referred to simply as engine speed NE, after the engine 10 is restarted.

For example, when an engine start request occurs according to the driver's ignition-key operation, the vehicle control system is designed to basically set an engine torque such that the engine 10 temporarily revs up in idle to a range from 1000 to 1300 RPM or thereabout. After the RPM of the engine 10 is temporarily increased, the vehicle control system is designed to gradually reduce the engine torque so as to prevent engine stall, to thereby finally maintain the engine speed NE at an idle speed of, for example, 800 RPM.

Specifically, in starting the engine 10, the vehicle control system is designed to create a peak of the engine torque within a period from the start of the engine restart to the timing when the engine speed NE reaches the idle speed. This engine revving-up in idle reliably restarts the engine 10 and gives the driver engine-restart feeling as engine sound (sound due to the change in the engine speed).

In contrast, in automatically restarting the engine 10, in order to prevent the occupants from feeling uncomfortable, it is preferable to reduce sound to be created by the engine restart task as low as possible. Thus, in restarting the engine 10, as illustrated in FIG. 12 by long dashed and short dashed line, the vehicle control system is configured to restrict the peak of the engine torque immediately after the start of the engine restart, in other words, restrict the engine revving-up in idle immediately after the start of the engine restart.

The restriction of the engine revving-up in idle can be implemented by various engine controls.

The various engine controls include the reduction of the opening of the throttle valve to thereby reduce the amount of air to be supplied to each cylinder (the amount of fuel to be sprayed into each cylinder), retard of the ignition timing by the igniter 15, and/or retard of the close timing of an intake valve (not shown) that allows the air-fuel mixture or air to flow in each cylinder. For example, when the vehicle is installed with an alternator, an increase in an electrical load for the alternator allows the engine revving-up in idle to be restricted.

In automatic restart of the engine 10, the restriction of the engine revving-up in idle may reduce the engine torque. Specifically, let us consider a case where the engine restart task is carried out by the release of the clutch pedal 17 with the gear position of the manual transmission 13 being any position other than the neutral position. In other words, let us consider a case where the engine restart task is carried out in condition that the depressed clutch pedal 17 over the first threshold value TH21 is reduced to be lower than the second threshold value TH22 with the gear position of the manual transmission 13 being any position other than the neutral position.

In such cases, because the release of the depressed clutch pedal 17 connects the output shaft 11 to the driving axels 26, it is necessary for the engine 10 to output a torque that overcomes loads applied to the driving axels 26. For this reason, in the engine restart by the clutch-pedal release, the restriction of the engine revving-up in idle may cause insufficient torque. The insufficient torque may cause engine stall.

In order to address such problems, in the engine restart by the clutch-pedal release, the vehicle control system according to the sixth embodiment is configured to increase an engine torque in comparison to an engine torque used in the engine restart by another means. In other words, in the engine restart by any means other than clutch-pedal release, the vehicle control system according to the sixth embodiment is configured to restrict an engine torque immediately after the restart of the engine 10 in comparison to that immediately after the start of the engine 10 in response to the driver's ignition-key operation.

In contrast, in the engine restart by clutch-pedal release, the vehicle control system according to the sixth embodiment is configured to:

disable the restriction of the engine revving-up in idle;

reduce the restriction of the engine revving-up in idle in comparison to the engine restarts by any means other than clutch-pedal release; or increase the engine torque immediately after the restart of the engine 10 in comparison to that immediately after the engine start in response to the driver's ignition-key operation.

This configuration sets the engine torque immediately after the restart of the engine 10 to be equivalent to or similar to an engine torque immediately after the start of the engine 10 in response to the driver's ignition-key operation.

Note that the restriction of the engine revving-up in idle represents the rate of reduction of the engine torque to a torque peak in the engine start in response to the driver's ignition-key operation.

An engine restart control routine (program) R6 included in the engine control programs stored in the storage medium 30a is configured to implement the specific feature set forth above. The ECU 30 repeatedly runs the engine restart control routine R6 in a given cycle during its being energized.

Figure 10:
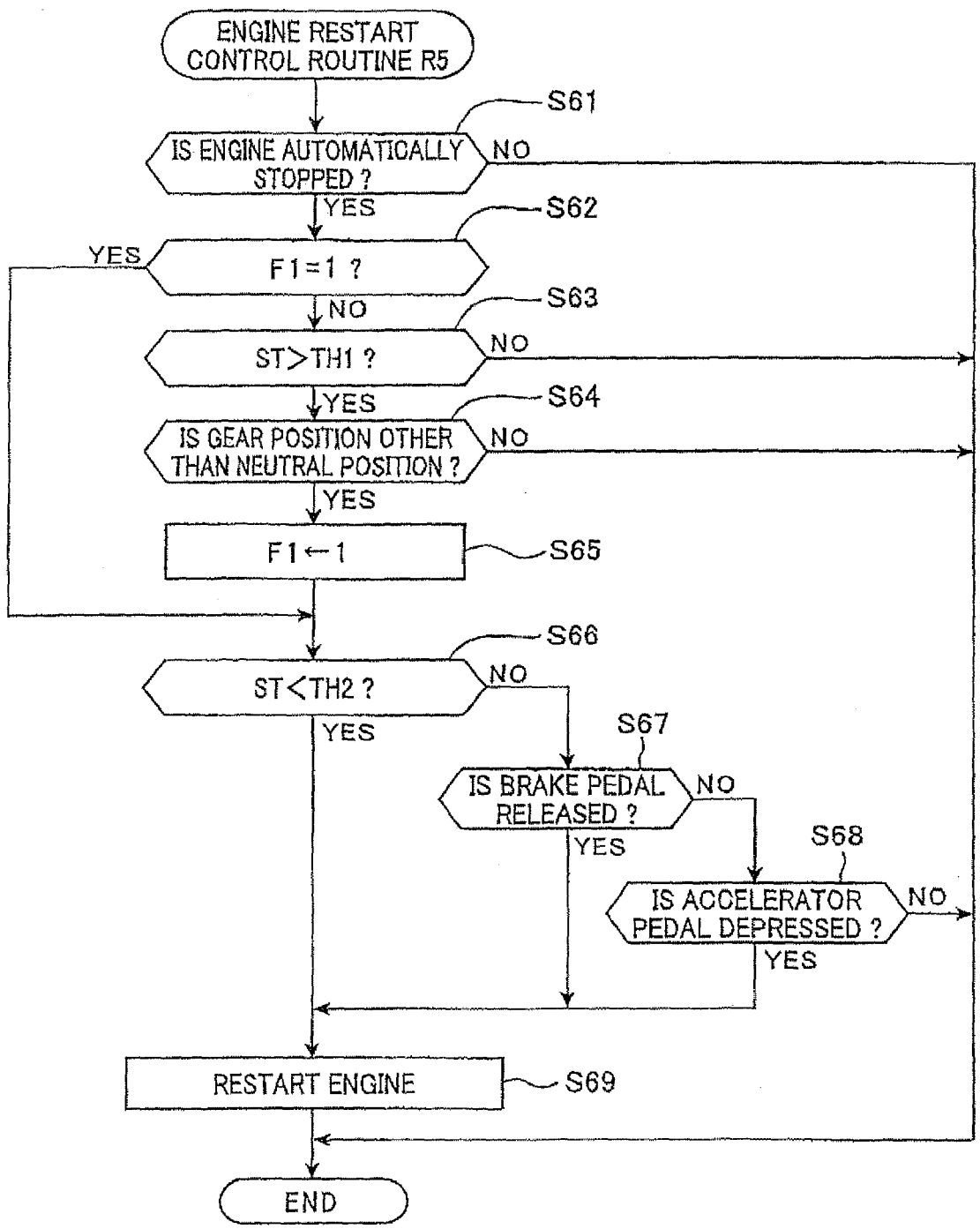
FIG. 10 is a flowchart schematically illustrating an engine restart control routine to be executed by the ECU according to the fifth embodiment of the present invention.

Specifically, in accordance with the engine restart control routine R6, the ECU 30 executes operations in steps 371 to S78 (see FIG. 13) equivalent to those in steps S61 to S68 illustrated in FIG. 10. These operations S71 to 378 determines whether the driver has an intention to restart the engine 10.

After the negative determination in step S76, when the affirmative determination is carried out in step S77 or 578, the execution point of the ECU 30 proceeds to step S80. In other words, after the clutch pedal 17 has been sufficiently depressed after the automatic stop of the engine 10, when the accelerator pedal 36 is depressed or the brake pedal 37 is released before the clutch-pedal stroke ST passes through the second threshold TH22, the execution point of the ECU 30 proceeds to step S80.

In step S80, the ECU 30 carries out the engine restart task while restricting the engine revving-up in idle.

Specifically, the ECU 30 sets the peak of an engine torque to be within a range suitable for reducing sound due to the change in the engine speed within a period (engine revving-up period) from the start of the engine restart to the timing when the engine speed NE reaches a preset idle speed, such as 800 RPM; this range is around a torque corresponding to the preset idle speed. For example, the peak of the engine torque is set to the sum of the torque corresponding to the preset idle speed and a preset value $\beta$. More specifically, as illustrated by long dash and short dash line in FIG. 12, the ECU 30 sets the peak of the engine torque within the engine revving-up period to be lower than the peak of an engine torque immediately after the engine start in response to the driver's ignition-key operation.

In contrast, after the clutch pedal 17 has been sufficiently depressed after the automatic stop of the engine 10, when the clutch-pedal stroke ST passes through the second threshold TH22, the execution point of the ECU 30 proceeds to step S81.

In step S81, the ECU 30 carries out the engine restart task while implementing the engine revving-up in idle immediately after the engine restart.

Specifically, the ECU 30 controls fuel injection of the injector 14 for each cylinder and/or air-fuel mixture ignition of the igniter therefor so that a torque that overcomes loads applied to the driving axels 26 is outputted from the engine 10. This control causes the peak, of the engine torque to appear within the engine revving-up period.

The local maximum value of the peak of the engine torque can be set to be equivalent to the peak of the engine torque immediately after the engine start in response to the driver's ignition-key operation (see FIG. 12), or set to be greater or slightly smaller than the peak of the engine torque immediately after the engine start in response to the driver's ignition-key operation.

In addition, when the negative determination is carried out in each of the operations in steps S73 and S74, the execution point of the ECU 30 is shifted to step S79.

In step S79, the ECU 30 determines whether at least one of the engine restart conditions except for the release of the clutch pedal 17 is met.

When no engine restart conditions except for the release of the clutch pedal 17 are met (NO in step S79), the ECU 30 terminates the engine restart control routine R6.

Otherwise, when at least one of the engine restart conditions except for the release of the clutch pedal 17 is met (YES in step S79), the ECU 30 proceeds to step S80, and carries out the engine restart task while restricting the engine revving-up in idle set forth above in step S80. This operation in step S80 reduces the change in the engine speed to thereby reduce sound due to the engine restart.

Next, the engine restart control routine R6 set forth above will be graphically described hereinafter with reference to the following timing chart of FIG. 14.

Figure 14:
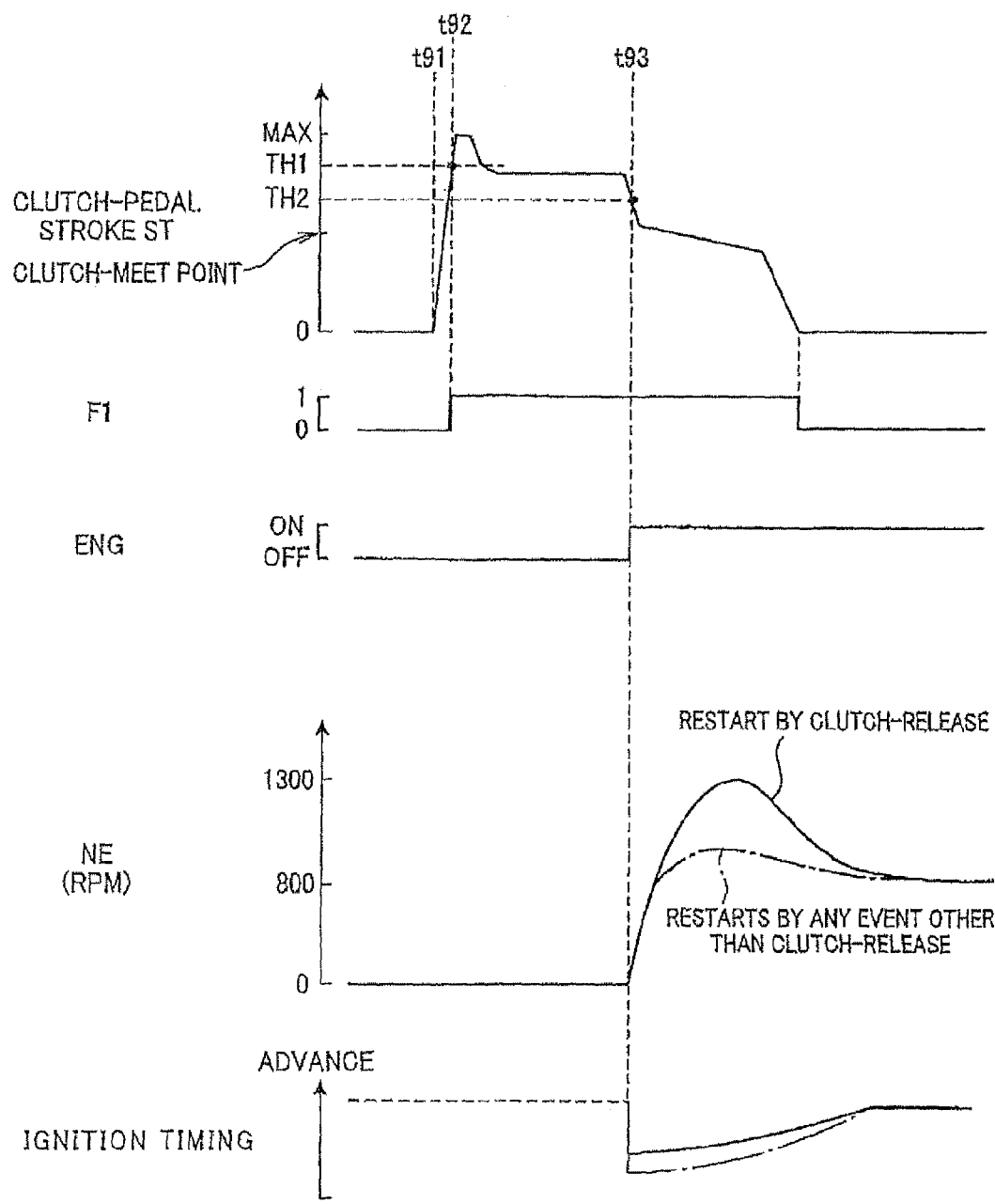
FIG. 14 is a timing chart illustrating the transition of the clutch-pedal stroke, the transition of the engine speed, and an ignition timing when an engine restart task is carried out while an engine revving-up in idle is restricted by the change in the ignition timing according to the sixth embodiment.

FIG. 14 is a timing chart illustrating the transition of the clutch-pedal stroke ST, the transition of the engine speed NE, and the ignition timing when the engine restart task is carried out while the engine revving-up in idle is restricted by the change in the ignition timing. Solid lines represent the transition of the engine speed NE and the ignition timing when the engine 10 is restarted in response to the clutch-pedal release. Long change and short change lines represent the transition of the engine speed NE and the ignition timing when the engine 10 is restarted in response to when at least one of the engine restart conditions other than the clutch-pedal release is met.

In FIG. 14, before a timing t91, the engine 10 is automatically stopped and the clutch pedal 17 is free.

After the timing t91, the clutch pedal 17 is started to be depressed so that stroke ST of the depressed clutch pedal 17 is increased. After the stroke ST of the depressed clutch pedal 17 exceeds the threshold value TH21 at a timing t92, when the stroke ST of the clutch pedal 17 is reduced to become lower than the second threshold TH22 at a timing t93, the engine restart control task is carried out (see "ON" in FIG. 14). Specifically, the cranking of the engine 10 is started by the stator 16, the fuel injection is started by the injector 14 for each cylinder, and the ignition is started by the igniter 15 therefor. The ignition timing is set to a predetermined restart starting position, for example, the most retarded crank angle, and gradually advanced.

At that time, let us consider that the engine is normally restarted in condition that at least one of the engine restart conditions other than the clutch-pedal release is met. As illustrated in FIG. 14 by long dashed and short dashed line, the ignition timing is retarded relative to the ignition timing when the engine start is carried out in response to the driver's ignition-key operation (see solid line in FIG. 14) so as to restrict an engine torque at the engine restart. This sets the engine torque to be a value that prevents the engine speed NE from exceeding than a value higher than the idle speed by a preset idle RPM; this value is for example set to be approximately within a range from 800 to 900 RPM.

In contrast, let us consider that the engine is restarted in condition that the clutch-pedal release is met. As illustrated in FIG. 14 by solid line, the vehicle control system is designed to create a peak of the engine torque within a period from the start of the engine restart at the timing t93 to the timing when the engine speed NE reaches the idle speed. That is, the vehicle control system determines an engine torque such that the idle RPM is increased up to an approximately 1300 RPM, and thereafter, reduced so that the idle RPM is maintained at a preset value, such as approximately 800 RPM. This ignition timing is set to be advanced relative to that used when the engine 10 is restarted on condition that at least one of the engine restart conditions other than the clutch-pedal release is met.

As described above, the vehicle control system according to the sixth embodiment is configured to increase an engine torque immediately after the engine restart in response to the clutch-pedal release in comparison to that immediately after the engine restart in response to any engine-restart request event other than the clutch-pedal restart. Specifically, in the engine restart in response to the clutch-pedal release, the torque peak immediately after the engine restart is restricted. In contrast, in the engine restart in response to any engine-restart request event other than the clutch-pedal release, the restriction of the torque peak immediately after the engine restart is disabled or reduced. This restricts the lack of torque immediately after the engine restart, thus preventing unexpected engine stall. This makes it possible to improve the drivability of the vehicle immediately after the engine restart.

Seventh Embodiment

Figure 15:
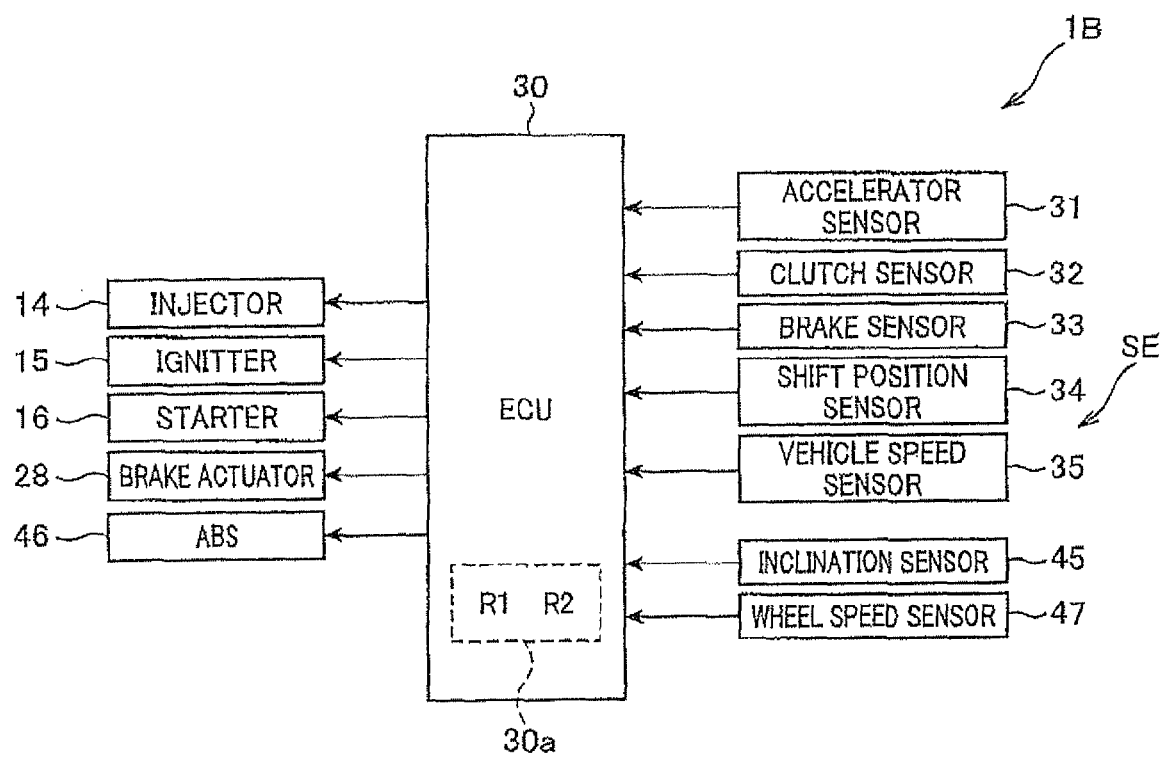
FIG. 15 is a schematic system configuration diagram of a vehicle control system according to the seventh embodiment of the present invention.
Figure 16:
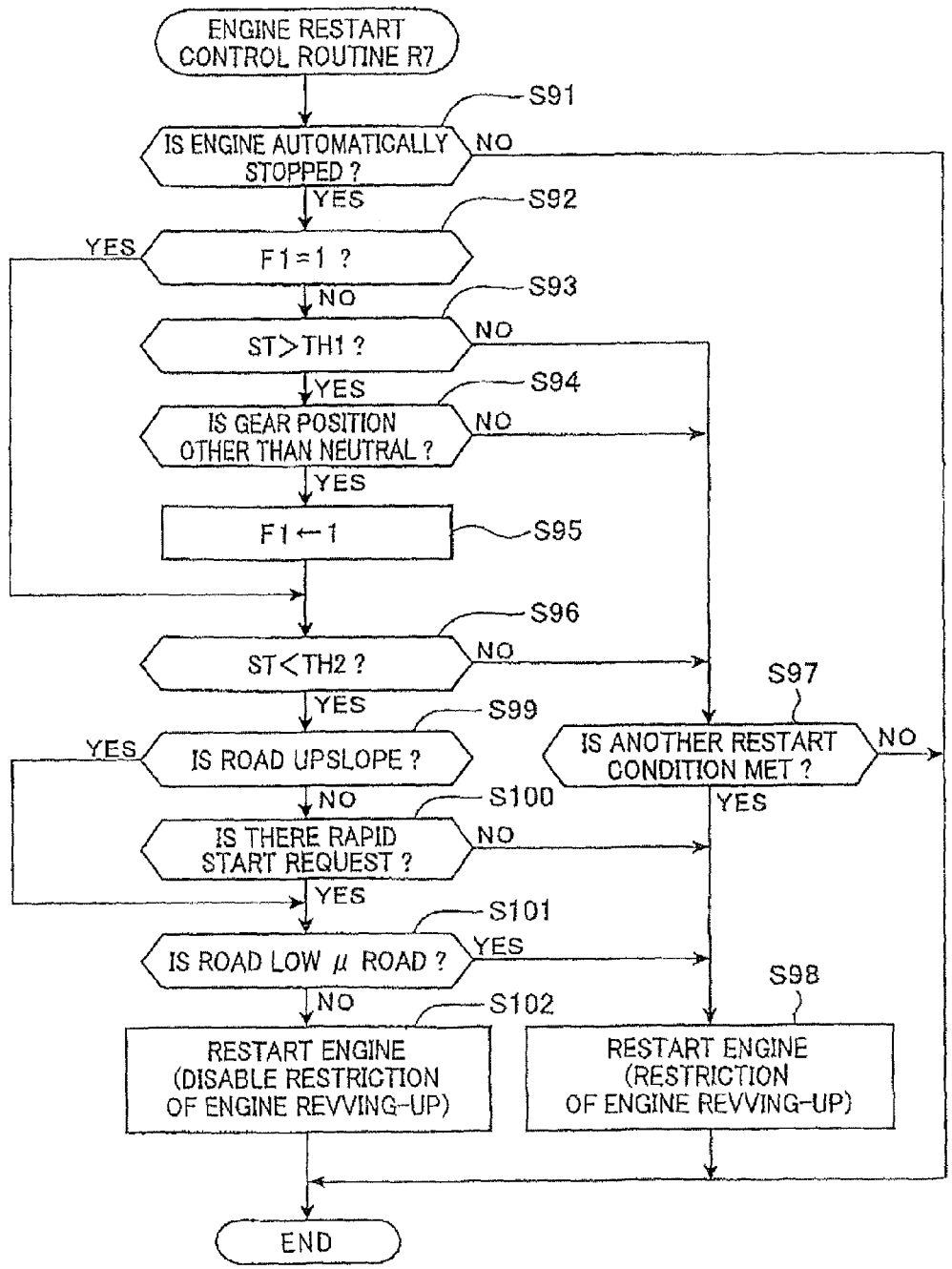
FIG. 16 is a flowchart schematically illustrating an engine restart control routine to be executed by the ECU illustrated in FIG. 15 according to the seventh embodiment.

A vehicle control system 1B according to the seventh embodiment of the present invention will be described hereinafter with reference to FIGS. 15 and 16.

The hardware structure of the vehicle control system 1B according to the seventh embodiment is substantially identical to that of the vehicle control system 1 according to the first embodiment. So, like parts between the vehicle control systems 1 and 1B according to the first and seventh embodiments, to which like reference characters are assigned, are omitted or simplified in description.

The software structure of the vehicle control system 1B according to the seventh embodiment is substantially identical to that of the vehicle control system according to the fifth embodiment except for the following points. So, like parts between the vehicle control systems according to the fifth and seventh embodiments are omitted or simplified in description.

The vehicle control system according to the fifth embodiment is configured to, after the clutch pedal 17 is fully depressed, carry out the engine restart task when the clutch-pedal stroke ST is returned to second threshold value TH22.

On the other hand, the vehicle control system 1B according to the seventh embodiment is configured to change how to carry out the engine restart task according to environments around the vehicle and the driver's manipulated information.

As a main difference point between the vehicle control systems 1 and 1B, the sensors SE include an inclination sensor 45. The inclination sensor 45 is operative to measure the inclination, of a road on which the vehicle is running or temporarily halting, and to output, to the ECU 30, measured inclination as data.

In addition, the vehicle control system 1B includes an anti-lock brake system (ABS) 46. The sensors SE include a wheel speed sensor 47 provided for each wheel and electrically connected to the ABS 46. The wheel speed sensor 47 is operative to measure a corresponding wheel speed and to output, to the ABS 46, the detected wheel speed as data.

The ABS 46 and the wheel speed sensor 47 can be installed in each of the vehicle control systems according to the first to sixth embodiments.

The ABS 46 is electrically connected at least to the ECU 30 and the brake actuator 28. The ABS 46 is designed to determine, based on the vehicle speed measured by the vehicle speed sensor 35 and the speed of each wheel measured by the wheel speed sensor 47, whether a corresponding wheel will lock up. For example, the ABS 46 is designed to calculate a slip ratio of each wheel based on the vehicle speed measured by the vehicle speed sensor 35 and the speed of each wheel measured by the wheel speed sensor 47, and determine whether the slip ratio of each wheel is higher than a first preset slip threshold value.

For example, when the measured speed of one wheel suddenly decreases while the vehicle running, the slip ratio is rapidly increased. Then, the ABS 46 is designed to determine that the one wheel will lock up.

According to the determination, the ABS 46 is designed to control the brake actuator 28 for at least the one wheel to thereby reduce the braking force to be applied thereto.

Thereafter, when the measured speed of one wheel returns a normal wheel speed (the one wheel resumes normal rotation), the ABS 46 is designed to control the brake actuator 28 for at least the one wheel to thereby increase the braking force to be applied thereto. The ABS 46 repeats the "pumping" (reduction and increase of the braking force) to thereby suddenly stop the vehicle without locking up the wheels.

As described in the sixth embodiment, in the engine start an response to the driver's ignition-key operation, the vehicle control system according to the seventh embodiment can control the engine 10 such that a torque created by the engine 10 immediately after the engine start is temporarily greater than a torque created by the engine 10 being in idle; this carries out a temporarily engine revving-up in idle.

In contrast, in the engine restart, the vehicle control system according to the seventh embodiment can control the engine 10 such that a torque created by the engine 10 immediately after the engine restart is reduced in comparison to the torque created by the engine 10 immediately after the engine start.

Particularly, in the engine restart in response to the clutch-pedal release, because the output shaft 11 is connected to the driving axels 26, the reduction in the torque created by the engine 10 immediately after the engine restart is reduced may adversely affect on the drivability of the vehicle.

Specifically, let us consider a case where the engine restart task is carried out by the release of the clutch pedal 17 with the vehicle driving up an uphill.

In such a case, because gravity acts in the direction opposite the vehicle running direction, in the engine restart by the clutch-pedal release, the restriction of the engine revving-up in idle may cause insufficient torque.

Specifically, because the release of the depressed clutch pedal 17 connects the output shaft 11 to the driving axels 26, when the gravity acting in the direction opposite the vehicle running direction is greater than force acting in the vehicle running direction, the vehicle may move down or the vehicle may be stalled.

In addition, when the driver has an intention to immediately start the vehicle in response to the restart of the engine 10, it is necessary to output an engine torque sufficient to meet the driver's request. Thus, the restriction of the engine revving-up in idle may cause the lack of torque; this may cause the driver to feel slow in restarting.

In view of the circumstances set force above, when restarting the engine 10 in response to the clutch-pedal release with the gear position of the manual transmission 13 being any position other than the neutral position, the vehicle control system 1B according to the seventh embodiment is configured to:

detect the driving performance required immediately after the engine restart; and increase an engine torque at the engine restart relative to a reference torque.

The driving performance includes specific parameters of the inclination of a road on which the vehicle is presented and the level of the driver's request to rapidly start the vehicle. The reference torque represents a torque required at the engine restart without consideration of the driving performance required immediately after the engine restart.

Specifically, in the engine restart by clutch-pedal release, when the road is an uphill (upslope) and/or there is a driver's request to rapidly start the vehicle, the vehicle control system 1B is configured to:

disable the restriction of the engine revving-up in idle;

reduce the restriction of the engine revving-up in idle (the rate of reduction of torque to a torque peak in the engine start in response to the driver's ignition-key operation) in comparison to the engine restarts by any means other than clutch-pedal release; or increase the engine torque immediately after the restart of the engine 10 in comparison to that immediately after the engine start in response to the driver's ignition-key operation.

This configuration allows a peak to appear in an output torque of the engine 10 immediately after it is restarted.

In other words, the vehicle control system 1B is configured to set the engine torque immediately after the restart of the engine 10 to be equivalent to or similar to an engine torque immediately after the start of the engine 10 in response to the driver's ignition-key operation.

In addition, the vehicle control system 1B is configured such that criteria for determination of whether the increase in the engine torque immediately after the engine restart (disable the restriction of the engine revving-up in idle) are defined. When the criteria are met, the vehicle control system is configured to prevent the increase in the engine torque immediately after the engine restart (restrict the amount of the engine revving-up in idle). The criteria in the seventh embodiment include that the road on which the vehicle is presented at the engine restart is a low μ road (slippery road) having a low friction factor in view of the fact that, when the road surface on which the vehicle is present is a wet road-surface or a frozen road-surface, a temporary increase in the engine torque may cause the road surface to become slippery.

An engine restart control routine (program) R7 included in the engine control programs stored in the storage medium 30a is configured to implement the specific feature set forth above. The ECU 30 repeatedly runs the engine restart control routine R7 in a given cycle during its being energized.

Figure 13:
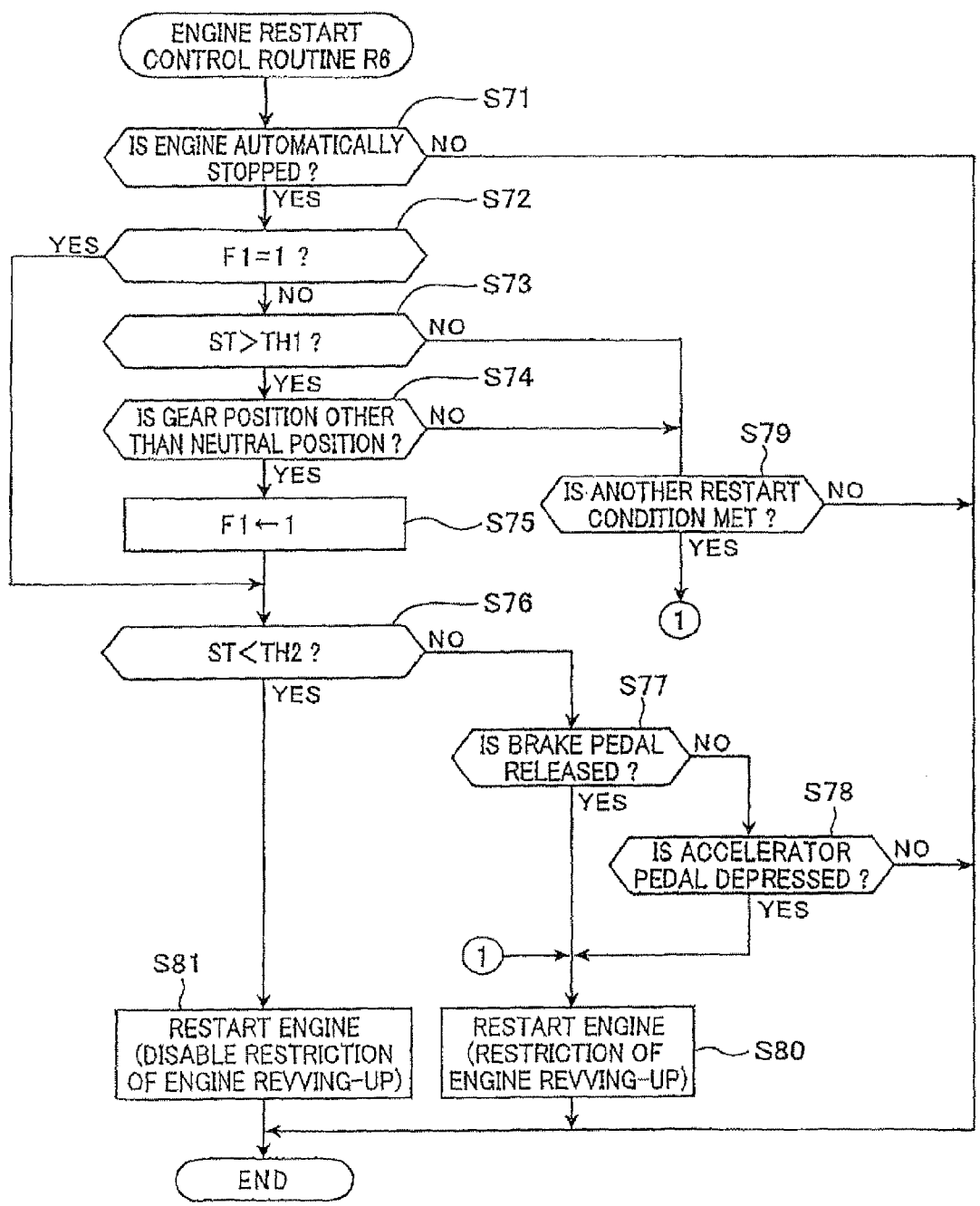
FIG. 13 is a flowchart schematically illustrating an engine restart control routine to be executed by the ECU according to the sixth embodiment of the present invention.

Specifically, in accordance with the engine restart control routine R7, the ECU 30 executes operations in steps S91 to S96 (see FIG. 16) equivalent to those in steps S71 to S76 illustrated in FIG. 13.

These operations S91 to S96 determine whether the driver has an intention to restart the engine 10.

When it is determined that no engine restart conditions for restarting the engine 10 according to the clutch-pedal release are met, that is, any one of steps S93, S94, and S96 is negative, the ECU 30 proceeds to step S97. In step S97, the ECU 30 determines whether at least one of the engine restart conditions except for the release of the clutch pedal 17 is met.

When no engine restart conditions except for the release of the clutch pedal 17 are met (NC) in step S97), the ECU 30 termininates the engine restart control routine R7.

Otherwise, when at least one of the engine restart conditions except for the release of the clutch pedal 17 is met (YES in step S97), the ECU 30 proceeds to step S98.

In step S98, the ECU 30 carries out the engine restart task while restricting the engine revving-up in idle set forth above (see the long dashed short dashed line in FIG. 12).

On the other hand, when the affirmative determination is carried out in step S96, in other words, when the ECU 30 determines to carry out the engine restart task according to the clutch-pedal release, the execution point of the ECU 30 is shifted to step S99.

In step S99, the ECU 30 calculates the inclination SL of the road on which the vehicle is present according to the data measured by the inclination sensor 45. Then, in step S99, the ECU 30 determines whether the road inclination SL is equal to or higher than a preset inclination.

Upon determining that the road inclination SL is equal to or greater than the preset inclination (YES in step S99), the ECU 30 determines that the road is an upslope having the road inclination SL equal to or higher than the preset inclination, then proceeding to step S101.

Note that the road inclination SL can be calculated based on the data measured by the vehicle speed sensor 35 and/or data measured by an acceleration sensor included in the sensors SE.

In step S100, the ECU 30 determines whether there is a driver's request to rapidly restart the engine 10 based on, for example, the data measured by the accelerator sensor 31.

Specifically, the ECU 30 calculates the amount of depression of the accelerator pedal 36 by the driver, and determines whether there is a driver's request to rapidly restart the engine 10 based on the amount of depression of the accelerator pedal 36.

For example, when the accelerator pedal 36 is depressed by the driver so that the amount of depression of the accelerator pedal 36 is changed to be equal to or higher than a preset threshold amount ATH within a preset period, for example, 0.5 to 1 seconds as a drive time of the starter 16, the ECU 30 determines that there is a driver's request to rapidly restart the engine 10.

Note that the determination of whether there is a driver's request to rapidly restart the engine 10 can be carried out based on, for example, the rate of change in depression of the accelerator pedal 36 or the change in foot pressure of the accelerator pedal 36.

When it is determined that the road inclination SL is lower than the preset inclination so that the road is not an upslope having the road inclination SL equal to or greater than the preset inclination (NO in step 599), and when it is determined that there is not a driver's request to rapidly restart the engine 10 (NO in step S100), the ECU 30 proceeds to step S98.

In step S98, the ECU 30 carries out the engine restart task while restricting the engine revving-up in idle set forth above (see the long dashed short dashed line in FIG. 12).

On the other hand, when it is determined that the road inclination SL is equal to or higher than the preset inclination so that the road is an upslope having the road inclination SL equal to or greater than the preset inclination (YES in step S99), or when it is determined that there is a driver's request to rapidly restart the engine 10 (YES in step S100), the ECU 30 proceeds to step S101.

In step S101, the ECU 30 determines whether the road on which the vehicle is presented is a low μ road (slippery road). For example, when the ABS 46 was activated during the vehicle being within a section of the road immediately before the automatic stop of the engine 10, the ECU 30 determines that the road is a low μ load (YES in step S101).

Note that, as a method of determining whether the road on which the vehicle is presented is a low μ road, an alternative method can be applied.

For example, the ECU 30 can calculate an average slip ratio of each wheel during the vehicle being within the section of the road immediately before the automatic stop of the engine 10, and determine whether the road is a low μ road according to the average slip ratio.

Specifically, the ECU 30 can calculate, based on the vehicle speed measured by the vehicle speed sensor 35 and the speed of each wheel measured by the wheel speed sensor 47, the average slip ratio of each wheel during the vehicle being within the section of the road immediately before the automatic stop of the engine 10. The ECU 30 can determine whether the average slip ratio is higher than a second preset threshold value. When it is determined that the average slip ratio is higher than the second preset threshold value, the ECU 30 can determine that the road is a low µ road. The second preset threshold value can be equal to, lower or higher than the first preset threshold value.

When it is determined that the road is not a low µ road (NO in step S101), the ECU 30 proceeds to step S102. In step S102, the ECU 30 carries out the engine restart task while implementing the engine revving-up in idle immediately after the engine restart.

Specifically, when it is determined that the vehicle does not meet the driving performance required for the vehicle immediately after the engine restart, such as the road on which the vehicle is presented is a low µ road, and/or the amount of depression of the accelerator pedal 36 is equal to or higher than the preset threshold amount ATH, the ECU 30 estimates the lack of torque immediately after the engine restart.

Thus, under such conditions, the ECU 30 increases the engine torque immediately after the engine restart to thereby prevent the lack of torque immediately after the engine restart, making it possible to prevent the engine 10 from stalling.

More specifically, the ECU 30 controls fuel injection of the injector 14 for each cylinder and/or air-fuel mixture ignition of the igniter therefor so that an engine torque that meets the driving performance required for the vehicle immediately after the engine restart is outputted from the engine 10. This control causes the peak of the engine torque to appear within the engine revving-up period (see solid line in FIG. 12).

Otherwise, when it is determined that the road is a low µ road (YES in step S101), the ECU 30 proceeds to step S98. In step S93, the ECU 30 carries out the engine restart task while restricting the engine revving-up in idle.

Specifically, in the engine restart in response to the clutch-pedal release, the increase in the engine torque is transferred to the driving axels 26 via the clutch 12. At that time, when the road on which the vehicle is presented is a low µ road, the increase in the engine torque immediately after the engine restart may cause each wheel to slip. Thus, in the engine restart in response to the clutch-pedal release, when the road e road on which the vehicle is presented is a low µ road, the ECU 30 restricts the engine revving-up in idle even if the road is an upslope having the road inclination SL equal to or higher than the preset inclination or the amount of depression of the accelerator pedal 36 is equal to or higher than the preset threshold amount ATH.

As described above, the vehicle control system 1B according to the seventh embodiment is configured to detect the driving performance required immediately after the engine restart, and increase the engine torque at the engine restart relative to the reference torque. The configuration prevents the lack of torque due to the drive performance required immediately after the engine restart. This prevention rapidly makes the vehicle start in its travelling direction, thus improving the drivability of the vehicle immediately after the engine restart.

In the engine restart in response to the clutch-pedal release, because the engine 10 is restarted with the engine output shaft 11 and the driving axel 26 being connected to each other, the drivability may be sensitive to the circumstances around the vehicle and/or the driver's intention in comparison to the engine restart in response to the driver's ignition-key operation. Thus, the configuration effectively achieves a benefit of improving the drivability immediately after the engine restart.

The vehicle control system 1B is configured to calculate the inclination SL of the road on which the vehicle is present as a parameter of the driving performance required immediately after the engine restart, and to determine the engine torque at the restart of the engine based on the inclination SL. This configuration outputs a torque that overcomes force acting on the vehicle in a direction orthogonal to the traveling direction of the vehicle. Thus, it is possible to prevent the vehicle from moving down along the road when the engine 10 is restarted on an upslope.

The vehicle control system 1B is configured to calculate the level of the driver's request to rapidly start the vehicle as a parameter of the driving performance required immediately after the engine restart, and to determine the engine torque at the restart of the engine based on the level of the driver's request. This configuration outputs a torque that meets the driver's request to rapidly start the vehicle. Thus, it is possible to rapidly start the vehicle in response to the driver's request to rapidly start the vehicle.

When the road on which the vehicle is presented is µ low a road, the vehicle control system 1B is configured to restrict the engine revving-up in idle, thus restricting each wheel 27 of the vehicle from slipping. During the vehicle being decelerated under engine automatic stop control, when one wheel 27 actually slipped, one wheel 27 may slip during the vehicle being accelerated after the restart of the engine 10. In view of the matter set forth above, the configuration according to the seventh embodiment implements the determination of whether the road on which the vehicle is a low µ road based on the operating conditions of the ABS 46. This configuration properly determines whether at least one of the wheels 27 easily slips.

The present invention is not limited to the aforementioned fifth to seventh embodiments.

In each of the fifth to seventh embodiments, the clutch sensor 32 is used to detect the clutch-pedal operated position (clutch-pedal stroke), but the present invention is not limited to the structure. For example, at least one clutch switch can be used to change the logical level of its output each time the clutch-pedal operated position reaches a preset position (preset stroke). When this modification is applied to the fourth embodiment, the first and second clutch switches are used The first switch can change the logical level of its output from Low to High when the clutch-pedal stroke ST reaches and exceeds the threshold value TH21. The second switch can change the logical level of its output from Low to High when the clutch-pedal stroke ST reaches and exceeds the threshold value TH22.

In each of the five and seventh embodiments, the vehicle control system is configured to, when the clutch pedal 17 is released to the clutch-meet point value or therearound with the actual selected gear position of the manual transmission 13 being set to be any position other than the neutral position, estimate that the driver intends to restart the engine 10, thus restarting the engine 10. However, the present invention is not limited to the structure.

Specifically, the vehicle control system is configured to, when the clutch pedal 17 is released to the clutch-meet point value or therearound with the actual selected gear position of the manual transmission 13 being set to be any one of the forward gear positions, estimate that the driver intends to restart the engine 10, thus restarting the engine 10.

In the fifth embodiment, when the accelerator pedal 36 and the brake pedal 37 are simultaneously depressed before the clutch-pedal stroke ST becomes lower than the second threshold value TH22, the vehicle control system can be designed to restart the engine 10. When this modification is applied to the sixth embodiment, the vehicle control system according to the sixth embodiment can be designed to restart the engine 10 while restricting the engine revving-up in idle.

In the seventh embodiment, the vehicle control system is configured to restart the engine 10 as long as the affirmative determination is carried out in each of steps S92 and S96. At that time, let us consider a case where it is determined that: the road is an upslope having the road inclination SL equal to or higher than the preset inclination (YES in step S99); or the driver there is a driver's request to rapidly restart the engine 10 (YES in step S100), and when it is determined that the road on which the vehicle is presented is not a low μ road (NO in step S101). In this case, the vehicle control system can be designed to increase an engine torque immediately after the engine restart in comparison to cases where the negative determination is carried out in steps S99 and 100.

Specifically, when the road is an upslope having the road inclination SL equal to or higher than the preset inclination or the amount of depression of the accelerator pedal 36 is changed to be equal to or higher than the preset threshold amount ATH, the vehicle control system can increase an engine torque in consideration that the engine torque may be insufficient immediately after the engine restart. This torque-increase prevents the lack of engine torque immediately after the engine restart, thus preventing engine stall.

The second threshold value TH22 can be set to be higher than the clutch-meet point value and close thereto as more as possible. This modification smoothly restarts the engine 10 when the driver's depression of the clutch pedal 17 is released close to the clutch-meet point value because this release probably shows that it is highly possible for the driver to have an intention to restart the engine 10.

In the seventh, embodiment, the vehicle control system can be configured to change the amount of the engine revving-up in idle based on the road inclination SL and the amount of depression of the accelerator pedal 36. This modification properly determines an engine torque immediately after the engine restart depending on the driving performance required immediately after the engine restart.

Specifically, the vehicle control system can store, in the storage medium 30a, information, such as a map, program, or a formula; this information represents a relationship among: a variable of the road inclination SL, a variable of the depression of the accelerator pedal 36, and the rate γ of reduction of the engine torque to a torque peak in the engine start in response to the driver's ignition-key operation. The vehicle control system extracts a value of the torque reduction rate γ corresponding to an actual value of the road inclination SL and that of the depression of the accelerator pedal 36, and calculates, based on the extracted value of the torque reduction rate γ, the amount of the engine revving-up in idle. At that time, the information can be designed such that:

the higher the road inclination SL is, the lower the torque reduction rate α is; and the greater the amount of depression of the accelerator pedal 36 is, the lower the torque reduction rate γ is.

This is because the high load inclination SL and/or the great amount of the accelerator's pedal depression requires a relatively high engine torque immediately after the engine restart.

In the seventh embodiment, the vehicle control system can be configured to:

set an engine torque to a reference torque when carrying out a control to restrict the engine revving-up in idle in the engine restart; and change the rate of increase in the engine torque to the reference torque according to the road inclination SL and/or the amount of depression of the accelerator pedal 36.

For example, in this modification, the vehicle control system can be configured to increase the rate of increase in the engine torque to the reference torque with increase in the road inclination. SL and/or with the increase the amount of depression of the accelerator pedal 36. This is because the high load inclination SL and/or the great amount of the accelerator' pedal depression requires a relatively high engine torque immediately after the engine restart. Note that the reference torque can be set to a torque used to restart the engine 10 when the road on which the vehicle is presented is a flat road (its road inclination SL is zero or very small value) and the amount of depression of the accelerator pedal 36 is kept zero within a predetermined period of time after the engine restart.

In the seventh embodiment, while restricting the engine torque by changing the ignition timing and/or the throttle-valve position after the completion of the starter's cranking, the vehicle control system can be configured to release the engine-torque restriction when determining that there is a driver's intention to immediately start the vehicle. The release of the engine-torque restriction is carried out after the timing when there is a driver's intention to immediately start the vehicle.

For example, the vehicle control system can be configured to change the ignition timing to be advanced at the timing when there is a driver's intention to immediately start the vehicle to increase temporarily the engine torque. The vehicle control system is configured to carry out this release control when the driver's intention to immediately start the vehicle appears until the engine speed is kept at an idle speed since the timing when the engine-restart request occurs.

In each of the first to seventh embodiments, the clutch pedal 17 is used as a clutch-operating member, but hand-operable clutch operating member, such as a grip clutch lever, can be used in place of the clutch pedal 17.

In each of the sixth and seventh embodiments, when the engine 10 is designed as a direct injection gasoline engine or a diesel engine, the vehicle control system can be configured to change the fuel-injection timing to be retarded to thereby restrict the engine revving-up in idle.

The features described in the respective first to seventh embodiments can be combined to each other.

While there has been described what is at present considered to be the embodiments and their modifications of the present invention, it will be understood that various modifications which are not described yet may be made therein, and it is intended to cover in the appended claims all such modifications as fall within the scope of the invention.

What is claimed is:

1. A system installed in a vehicle having an internal combustion engine, a transmission, and a clutch with a driver-operable clutch member, according to a driver's operation of the driver-operable clutch member, the clutch being engaged in a first state to allow a transfer of power from the internal combustion engine to the transmission and disengaged in a second state to shut off the transfer of the power, the transmission having one gear position selected from a plurality of gear positions for converting, according to the selected one of the plurality of gear positions, the power to be outputted from the transmission, the plurality of gear positions including a neutral position, the system being configured to restart, according to at least one engine restart condition is met, the internal combustion engine that has been automatically controlled for stop thereof, the system comprising:

a restart-condition determiner configured to determine whether the one gear position of the transmission is any gear position in the plurality of gear positions other than the neutral position and an operated variable of the driver's clutch operable member is increased from a first threshold value and thereafter to become lower than the first threshold value and lower than a second threshold value, the second threshold value being higher than a preset value corresponding to a clutch-meet point, the clutch-meet point representing a start of the transfer of the power from the internal combustion engine to the transmitter; and a restart controller configured to determine that the at least one engine restart condition is met to thereby carry out the restart of the internal combustion engine when it is determined that the one gear position of the transmission is any gear position in the plurality of gear positions other than the neutral position and the operated variable of the driver's clutch operable member is increased from the first threshold value and thereafter to become lower than the first threshold value and lower than the second threshold value.

2. The system according to claim 1, wherein the second threshold value is set such that, when the operated variable of the driver's clutch operable member is shifted to the second threshold value, a speed of the internal combustion engine is estimated to reach a preset value required for the restart of the internal combustion engine during the driver's clutch operable member being operated from the second threshold value to the preset value corresponding to the clutch-meet point.

3. The system according to claim 1, wherein the second threshold value is set such that a time required to shift the operated variable of the driver's clutch operable member from the second threshold value to the preset value corresponding to the clutch-meet point is estimated to be longer than a preset time required until the internal combustion engine is restarted since the meeting of the at least one engine restart condition.

4. The system according to claim 1, wherein the second threshold value is set to be close to the preset value corresponding to the clutch-meet point.

5. The system according to claim 1, further comprising an accelerator detector that detects an operation of a driver-operable accelerator member for inputting a driver's acceleration request of the vehicle, wherein the restart controller is configured to carry out the restart of the internal combustion engine when the operation of a driver-operable accelerator member is detected by the accelerator detector.

6. The system according to claim 1, further comprising a brake detector that detects an operation of a driver-operable brake member for inputting a driver's brake request of the vehicle, wherein the restart controller is configured to carry out the restart of the internal combustion engine when the operation of the driver-operable brake member is detected by the brake detector.

7. The system according to claim 1, further comprising a torque increasing unit configured to increase, relative to a reference torque, an output torque of the internal combustion engine restarted by the restart controller, the reference torque representing a torque required at the restart of the internal combustion engine without consideration of a driving performance required immediately after the restart of the internal combustion engine.

8. The system according to claim 1, further comprising a torque controlling unit configured to:
restrict an output torque of the internal combustion engine restarted according to when an alternative engine restart condition is met, the restricted output torque being lower than an output torque of the internal combustion engine started in response to a driver's ignition key operation; and carry out any one of:
a reduction of a restriction of the output torque of the internal combustion engine restarted by the restart controller in comparison to a restriction of the output torque of the internal combustion engine restarted according to when an alternative engine restart condition is met;
a disabling of the restriction of the output torque of the internal combustion engine restarted by the restart controller; and
an increase in the output torque of the internal combustion engine restarted by the restart controller relative to a case where the restriction of the output torque of the internal combustion engine restarted by the restart controller is disabled.

9. The system according to claim 1, further comprising:
a required driving performance detector configured to detect a value of a parameter of the driving performance required immediately after the restart of the internal combustion engine; and
a torque controlling unit configured to control, according to the value of the parameter of the driving performance required immediately after the restart of the internal combustion engine, an output torque of the internal combustion engine.

10. The system according to claim 9, wherein the torque increasing unit is configured to increase, relative to a reference torque, the output torque of the internal combustion engine restarted by the restart controller according to the value of the parameter of the driving performance, the reference torque representing a torque required at the restart of the internal combustion engine without consideration of the driving performance required immediately after the restart of the internal combustion engine.

11. The system according to claim 9, wherein the torque controlling unit is configured to carry out, according to the value of the parameter of the driving performance, any one of:
the reduction of the restriction of the output torque of the internal combustion engine restarted by the restart controller in comparison to the restriction of the output torque of the internal combustion engine restarted according to when an alternative engine restart condition is met;
the disabling of the restriction of the output torque of the internal combustion engine restarted by the restart controller; and
the increase in the output torque of the internal combustion engine restarted by the restart controller relative to the case where the restriction of the output torque of the internal combustion engine restarted by the restart controller is disabled.

12. The system according to claim 9 wherein the required driving performance detector is configured to detect, as the value of the parameter of the driving performance required immediately after the restart of the internal combustion engine, a value of an inclination of a road on which the vehicle is presented.

13. The system according to claim 9 wherein the required driving performance detector is configured to detect, as the value of the parameter of the driving performance required immediately after the restart of the internal combustion engine, a level of a driver's request to rapidly start the vehicle.

14. The system according to claim 13 wherein the required driving performance detector is configured to detect, as the level of the driver's request to rapidly start the vehicle, an operated state of a driver-operable accelerator member for inputting a driver's acceleration request of the vehicle.

15. The system according to claim 9 further comprising: a friction condition detector configured to detect a friction condition between the vehicle and a road on which the vehicle is presented, wherein the restart controller is configured to determine whether to disable a control of the output torque according to the friction condition.

16. The system according to claim 15, further comprising a braking unit configured to brake the vehicle when there is a slip of the vehicle during the vehicle being decelerated, wherein the friction detecting unit is configured to detect, within a preset period of time immediately before a stop of the vehicle, the friction condition between the vehicle and the road according to an operated state of the braking unit.

17. A system installed in a vehicle having an internal combustion engine, a transmission, and a clutch, the clutch being engaged in a first state to allow a transfer of power from the internal combustion engine to the transmission and disengaged in a second state to shut off the transfer of the power, the system being configured to restart, according to at least one engine restart condition is met, the internal combustion engine that has been automatically controlled for stop thereof, the system comprising:
  a restart-condition determiner configured to determine that, as the at least one engine restart condition, an operation of the clutch is started by a driver of the vehicle for shifting the second state to the first state;
  a state detector configured to detect an operated state of the clutch during the clutch being shifted from the second state to the first state; and
  a restart controller configured to determine whether to enable or disable the restart of the internal combustion engine according to the operated state of the clutch detected by the state detector,
  wherein the clutch comprises a driver-operable clutch member, a driver's operation of the driver-operable clutch member shifting the clutch from the first state to the second state, a release of the driver's operation of the driver-operable clutch member shifting the clutch from the second state to the first state, the state detector is configured to detect, as the operated state of the clutch during the clutch being shifted from the second state to the first state, a parameter associated with a time taken to release the driver's operation of the driver-operable clutch member so as to shift the clutch from the second state to the first state, and the restart controller is configured to determine whether the time taken to release the driver's operation of the driver-operable clutch member is shorter than a preset threshold value according to the detected parameter, and disable the restart of the internal combustion engine when it is determined that the time taken to release the driver's operation of the driver-operable clutch member is shorter than the preset threshold value.

18. The system according to claim 17, wherein the state detector is configured to detect the parameter associated with the time taken to release the driver's operation of the driver-operable clutch member when a position of the driver-operable clutch member to release the driver's operation of the driver-operable clutch member is within a preset range between a first value corresponding to the second state of the clutch and a second value corresponding to a clutch-meet point, the clutch-meet point representing a start of the transfer of the power from the internal combustion engine to the transmitter.

19. The system according to claim 17, wherein the state detector is configured to detect the parameter associated with the time taken to release the driver's operation of the driver-operable clutch member when a position of the driver-operable clutch member to release the driver's operation of the driver-operable clutch member is within a preset range including a value corresponding to a clutch-meet point, the clutch-meet point representing a start of the transfer of the power from the internal combustion engine to the transmitter.

20. The system according to claim 19, wherein the preset range is defined a range between the value corresponding to a clutch-meet point as a first threshold value and a second threshold value located closer to the first state of the clutch in comparison to the first threshold value.

21. The system according to claim 17, wherein the state detector is configured to detect, as the operated state of the clutch during the shift of the clutch from the second state to the first state, whether the clutch is in a half-engaged state, and the restart controller is configured to determine to disable the restart of the internal combustion engine when it is determined that the clutch is not in the half-engaged state.

22. The system according to claim 17, further comprising an accelerator detector that detects a driver-operable accelerator member for inputting a driver's acceleration request of the vehicle, wherein the restart controller is configured to determine to enable the restart of the internal combustion engine while the driver-operable accelerator member is operated independently of the operated state of the clutch detected by the state detector.

23. The system according to claim 17, further comprising a driver-operation detector that detects an operation of the driver for a device unrelated to driving of the vehicle during the clutch being operated by the driver so as to be disengaged to shut off the transfer of the power, wherein the restart controller is configured to determine to disable the restart of the internal combustion engine when the driver-operation detector detects the operation of the driver except for the driver's operation required to drive the vehicle independently of the operated state of the clutch detected by the state detector.

24. The system according to claim 17, further comprising a brake member for braking the vehicle when the restart controller determines to disable the restart of the internal combustion engine. internal combustion engine according to the pressure of the depressed clutch pedal during the release of the depressed clutch pedal.

25. A system installed in a vehicle having an internal combustion engine, a transmission, and a clutch, the clutch being engaged in a first state to allow a transfer of power from the internal combustion engine to the transmission and disengaged in a second state to shut off the transfer of the power, the system being configured to restart, according to at least one engine restart condition is met, the internal combustion engine that has been automatically controlled for stop thereof, the system comprising:
  a restart-condition determiner configured to determine that, as the at least one engine restart condition, an operation of the clutch is started by a driver of the vehicle for shifting the second state to the first state;
  a state detector configured to detect an operated state of the clutch during the clutch being shifted from the second state to the first state; and
  a restart controller configured to determine whether to enable or disable the restart of the internal combustion engine according to the operated state of the clutch detected by the state detector, wherein the clutch comprises a clutch pedal allowed to be depressed by the driver, a driver's depression of the clutch pedal shifting the clutch from the first state to the second state, a release of the driver's depression of the clutch pedal shifting the clutch from the second state to the first state, the state detector is configured to detect, as the operated state of the clutch during the clutch being shifted from the second state to the first state, a pressure of the depressed clutch pedal, and the restart controller is configured to determine whether to enable or disable the restart of the internal combustion engine according to the pressure of the depressed clutch pedal during the release of the depressed clutch pedal.

26. The system according to claim 25, wherein the restart controller is configured to determine whether to enable or disable the restart of the internal combustion engine according to a change in the pressure of the depressed clutch pedal during the release of the depressed clutch pedal.

27. The system according to claim 25, wherein the restart controller is configured to determine whether to enable or disable the restart of the internal combustion engine according to the pressure of the depressed clutch pedal during the release of the depressed clutch pedal when a position of the depressed clutch pedal reaches a value or thereabout, the value corresponding to a clutch-meet point that represents a start of the transfer of the power from the internal combustion engine to the transmission.

28. The system according to claim 25, wherein the restart controller is configured to determine whether to enable or disable the restart of the internal combustion engine according to the pressure of the depressed clutch pedal during the release of the depressed clutch pedal before a position of the depressed clutch pedal reaches a value corresponding to a clutch-meet point, the clutch-meet point representing a start of the transfer of the power from the internal combustion engine to the transmission.

29. A system installed in a vehicle having an internal combustion engine, a transmission, and a clutch, the clutch being engaged in a first state to allow a transfer of power from the internal combustion engine to the transmission and disengaged in a second state to shut off the transfer of the power, the system being configured to restart, according to at least one engine restart condition is met, the internal combustion engine that has been automatically controlled for stop thereof, the system comprising:

a restart-condition determiner configured to determine that, as the at least one engine restart condition, an operation of the clutch is started by a driver of the vehicle for shifting the second state to the first state;

a state detector configured to detect an operated state of the clutch during the clutch being shifted from the second state to the first state; and a restart controller configured to determine whether to enable or disable the restart of the internal combustion engine according to the operated state of the clutch detected by the state detector, wherein the clutch comprises a driver-operable clutch member, a driver's operation of the driver-operable clutch member shifting the clutch from the first state to the second state, a release of the driver's operation of the driver-operable clutch member shifting the clutch from the second state to the first state, the state detector is configured to detect, as the operated state of the clutch during the clutch being shifted from the second state to the first state, a parameter associated with a change in a rate of the release of the driver's operation of the driver-operable clutch member so as to shift the clutch from the second state to the first state, and the restart controller is configured to determine whether the rate of the release of the driver's operation of the driver-operable clutch member is higher than a preset threshold rate according to the detected parameter, and disable the restart of the internal combustion engine when it is determined that the rate of the release of the driver's operation of the driver-operable clutch member is higher than the preset threshold rate.

30. The system according to claim 29, wherein the state detector is configured to detect the parameter associated with the change in the rate of the release of the driver's operation of the driver-operable clutch member at a plurality of timings when a position of the driver-operable clutch member to release the driver's operation of the driver-operable clutch member is within a preset range between a first value corresponding to the second state of the clutch and a second value corresponding to a clutch-meet point, the clutch-meet point representing a start of the transfer of the power from the internal combustion engine to the transmitter.

* * * * *